US012020153B2

(12) United States Patent
Adrian et al.

(10) Patent No.: US 12,020,153 B2
(45) Date of Patent: Jun. 25, 2024

(54) DEVICE AND METHOD FOR TRAINING AN IMAGE GENERATOR

(71) Applicant: Robert Bosch GmbH, Stuttgart (DE)

(72) Inventors: David Adrian, Stuttgart (DE); Nicolai Waniek, Dornstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 386 days.

(21) Appl. No.: 17/457,311

(22) Filed: Dec. 2, 2021

(65) Prior Publication Data

US 2022/0180189 A1 Jun. 9, 2022

(30) Foreign Application Priority Data

Dec. 8, 2020 (DE) .................... 10 2020 215 461.9

(51) Int. Cl.
*G06N 3/08* (2023.01)
*G06N 3/045* (2023.01)
*G06T 7/00* (2017.01)

(52) U.S. Cl.
CPC .............. *G06N 3/08* (2013.01); *G06N 3/045* (2023.01); *G06T 7/0002* (2013.01); *G06T 2207/10016* (2013.01); *G06T 2207/20081* (2013.01); *G06T 2207/20084* (2013.01)

(58) Field of Classification Search
CPC .......... G06N 3/045; G06N 3/047; G06N 3/08; G06N 3/084; G06N 3/088; G06T 11/00; G06T 2207/10016; G06T 2207/20081; G06T 2207/20084; G06T 7/0002
See application file for complete search history.

(56) References Cited

U.S. PATENT DOCUMENTS

| 2017/0161633 | A1* | 6/2017 | Clinchant | G06N 20/00 |
| 2017/0347110 | A1* | 11/2017 | Wang | G06T 7/11 |
| 2019/0065895 | A1* | 2/2019 | Wang | G06V 40/172 |
| 2019/0304102 | A1* | 10/2019 | Chen | G06N 20/00 |
| 2020/0020098 | A1* | 1/2020 | Odry | G06N 3/045 |

(Continued)

OTHER PUBLICATIONS

Ling-Qun Zuo,"Natural Scene Text Recognition Based on Encoder-Decoder Framework," May 24, 2019,IEEE Access,vol. 7, 2019,pp. 62616-62620.*

(Continued)

*Primary Examiner* — Omar S Ismail
(74) *Attorney, Agent, or Firm* — NORTON ROSE FULBRIGHT US LLP; Gerard A. Messina

(57) ABSTRACT

A device and a method for training an image generator. The method includes: providing an image sequence that includes an image for each time of a plurality of times; training a first encoder, a second encoder, and a decoder by: for each of a number of times of the plurality of times: for the image assigned to the time, producing a multiplicity of feature maps for the image by a neural network and grouping them into first and second subsets; supplying the first subset to the first encoder to produce first feature vector; supplying the second subset to the second encoder to produce a second feature vector; supplying the first feature vector and the second feature vector to the decoder to produce a predicted target image; producing an error value; and adapting the first encoder, the second encoder, and the decoder to reduce the error value.

15 Claims, 15 Drawing Sheets

(56) References Cited

U.S. PATENT DOCUMENTS

| | | | |
|---|---|---|---|
| 2020/0051206 A1* | 2/2020 | Munkberg | G06T 3/18 |
| 2020/0084427 A1* | 3/2020 | Sun | G06N 3/045 |
| 2020/0098135 A1* | 3/2020 | Ganjineh | G06F 16/587 |
| 2020/0143171 A1* | 5/2020 | Lee | G06V 20/49 |
| 2020/0151860 A1* | 5/2020 | Safdarnejad | G06T 7/162 |
| 2020/0210763 A1* | 7/2020 | Lin | G06V 10/764 |
| 2020/0210768 A1* | 7/2020 | Turkelson | G06V 40/63 |
| 2020/0293064 A1* | 9/2020 | Wu | G06F 18/214 |
| 2020/0348662 A1* | 11/2020 | Cella | G05B 19/41865 |
| 2020/0394459 A1* | 12/2020 | Xu | G06N 3/045 |
| 2021/0110089 A1* | 4/2021 | Chen | G06T 7/0004 |
| 2021/0133439 A1* | 5/2021 | Mehra | G06N 3/02 |
| 2021/0256766 A1* | 8/2021 | Muhlethaler | G06T 19/006 |
| 2021/0295606 A1* | 9/2021 | Kim | G06T 17/20 |
| 2022/0156939 A1* | 5/2022 | Homayounfar | G06V 10/945 |

OTHER PUBLICATIONS

Xin Huang,"Multi-Attention and Incorporating Background Information Model for Chest X-Ray Image Report Generation," Nov. 5, 2019,vol. 7, 2019,pp. 154808-154813.*

Siwei Ma,"Image and Video Compression Wit Neural Networks: A Review," Apr. 17, 2019,IEEE Transactions on Circuits and Systems for Video Technology, vol. 30, No. 6, Jun. 2020,pp. 1683-1690.*

Johannes Michael,"Evaluating Sequence-to-Sequence Models for Handwritten Text Recognition," Feb. 3, 2020,2019 International Conference on Document Analysis and Recognition (ICDAR),pp. 1286-1290.*

Jiahui Qu et al.,"A Multilevel Encoder-Decoder Attention Network for Change Detection in Hyperspectral Images" Nov. 23, 2021,IEEE Transactions on Geoscience and Remote Sensing, vol. 60, 2022, pp. 1-10.*

Zhengyin Du ,"Spatio-Temporal Encoder-Decoder Fully Convolutional Network for Video-Based Dimensional Emotion Recognition," Sep. 10, 2019,IEEE Transactions on Affective Computing, vol. 12, No. 3, Jul.-Sep. 2021,pp. 565-570.*

Tung Kieu,"Outlier Detection for Multidimensional Time Series using Deep Neural Networks," Jul. 16, 2018,2018 19th IEEE International Conference on Mobile Data Management,pp. 125-133.*

Bin Pu,"ED-ACNN: Novel attention convolutional neural network based on encoder-decoder framework for human traffic prediction," Sep. 18, 2020,Applied Soft Computing Journal 97 (2020) 106688,pp. 1-10.*

Shancheng Fang,"Attention and Language Ensemble for Scene Text Recognition with Convolutional Sequence Modeling," Oct. 15, 2018,MM'18, Oct. 22-26, 2018,pp. 248-252.*

P. Sermanet et al. "Time-Contrastive Netwerks: Self-Supervised Learning from Video" in IEEE International Conference on Robotics and Automation, 2018. 8 Pages.

Jingwei Xu "Structure Preserving Video Prediction" In IEEE/CVF Conference on Computer Vision and Pattern Recognition, 2018. 10 Pages.

Wen Liu et al. "Margin Learning Embedded Prediction for Video Anomaly Detection with a Few Anomalies" Proceedings of the Twenty-Eighth International Joint Conference on Artificial Intelligence (IJCAI-19). 8 Pages.

* cited by examiner

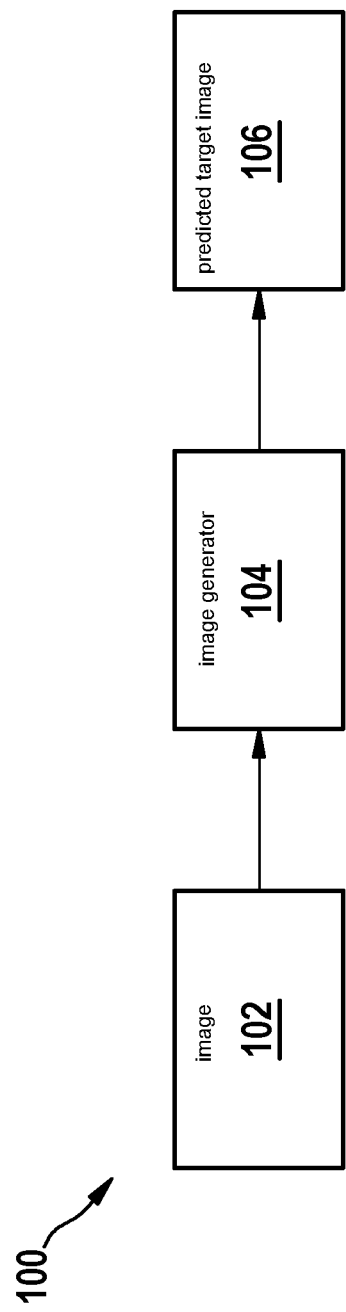

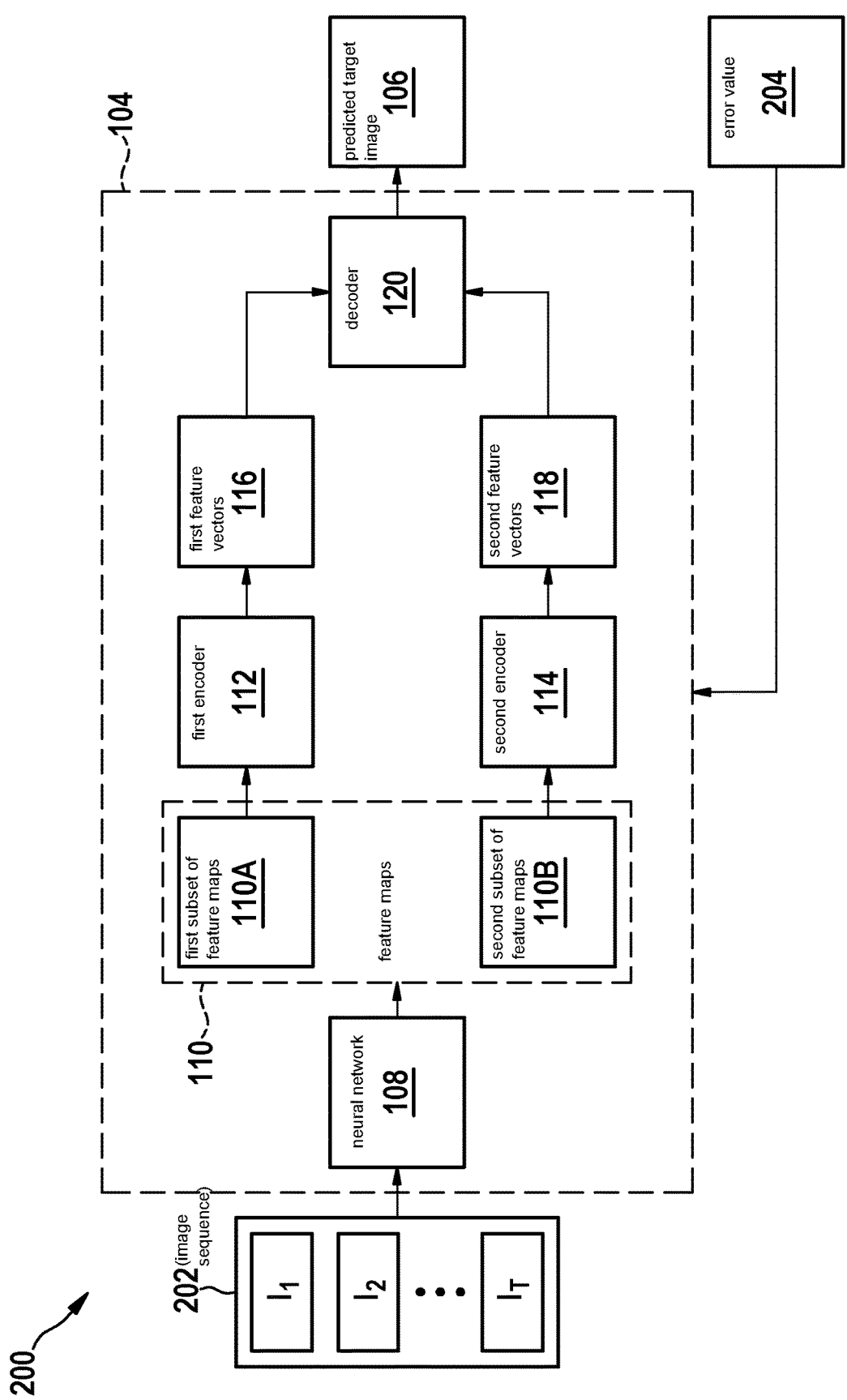

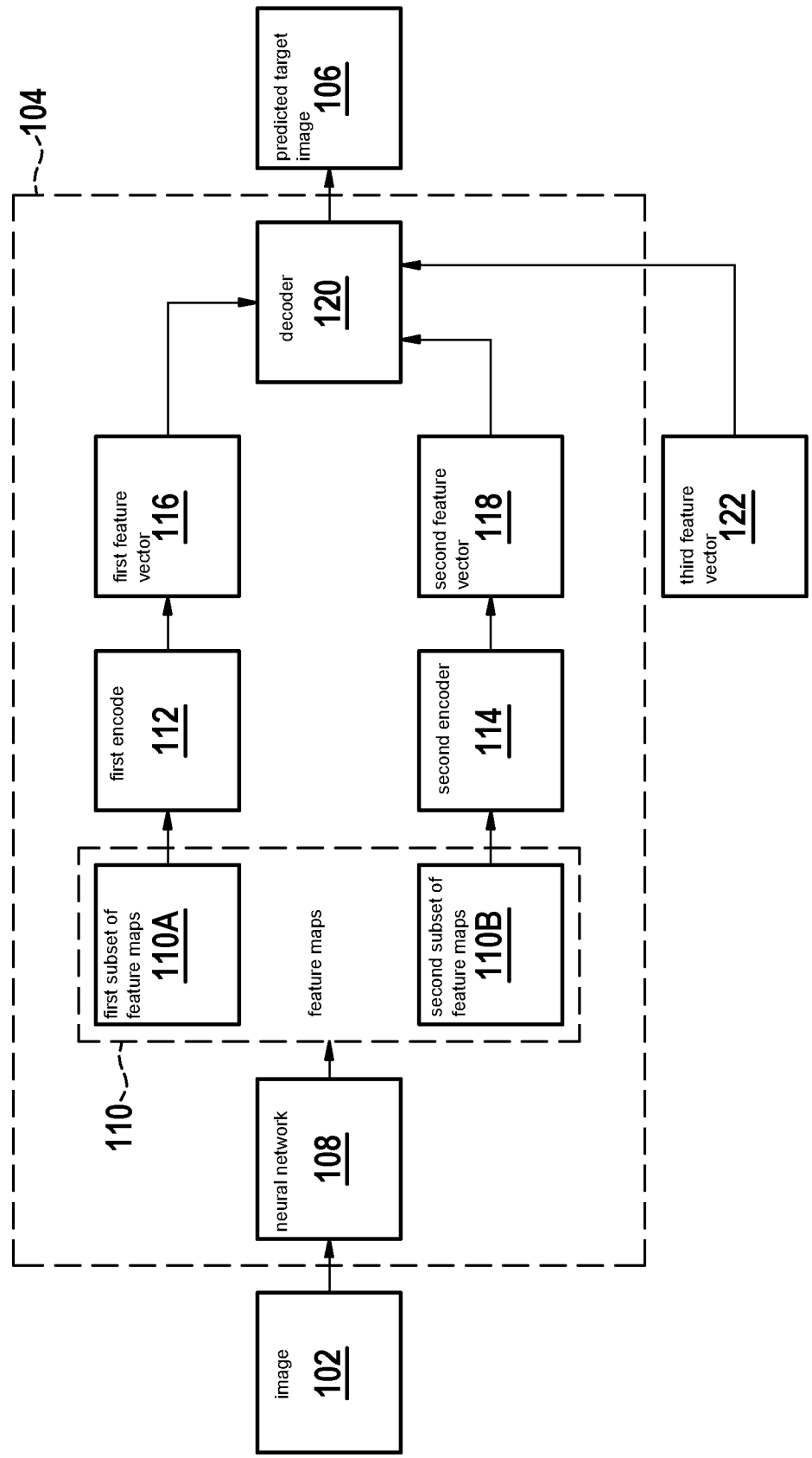

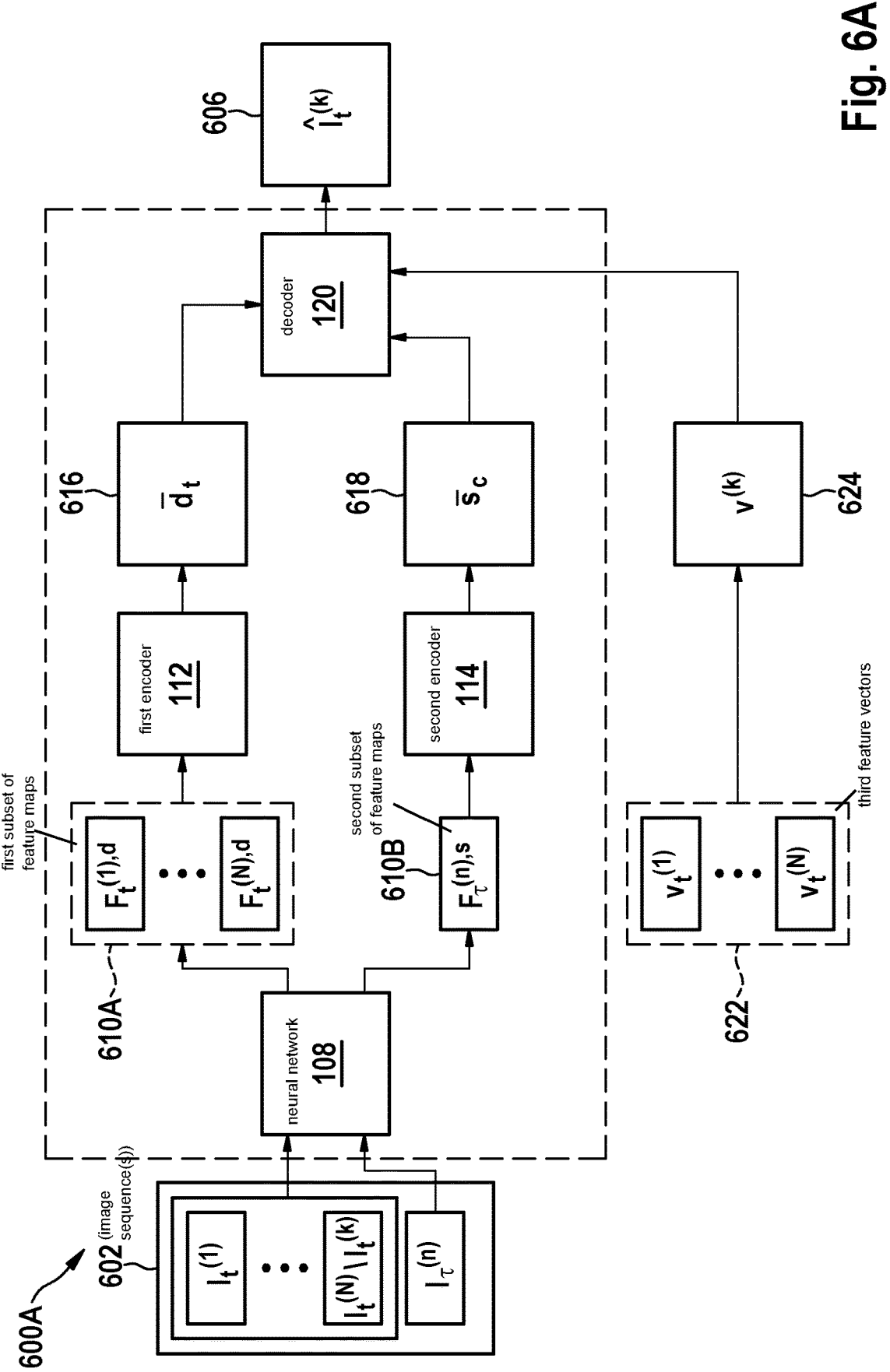

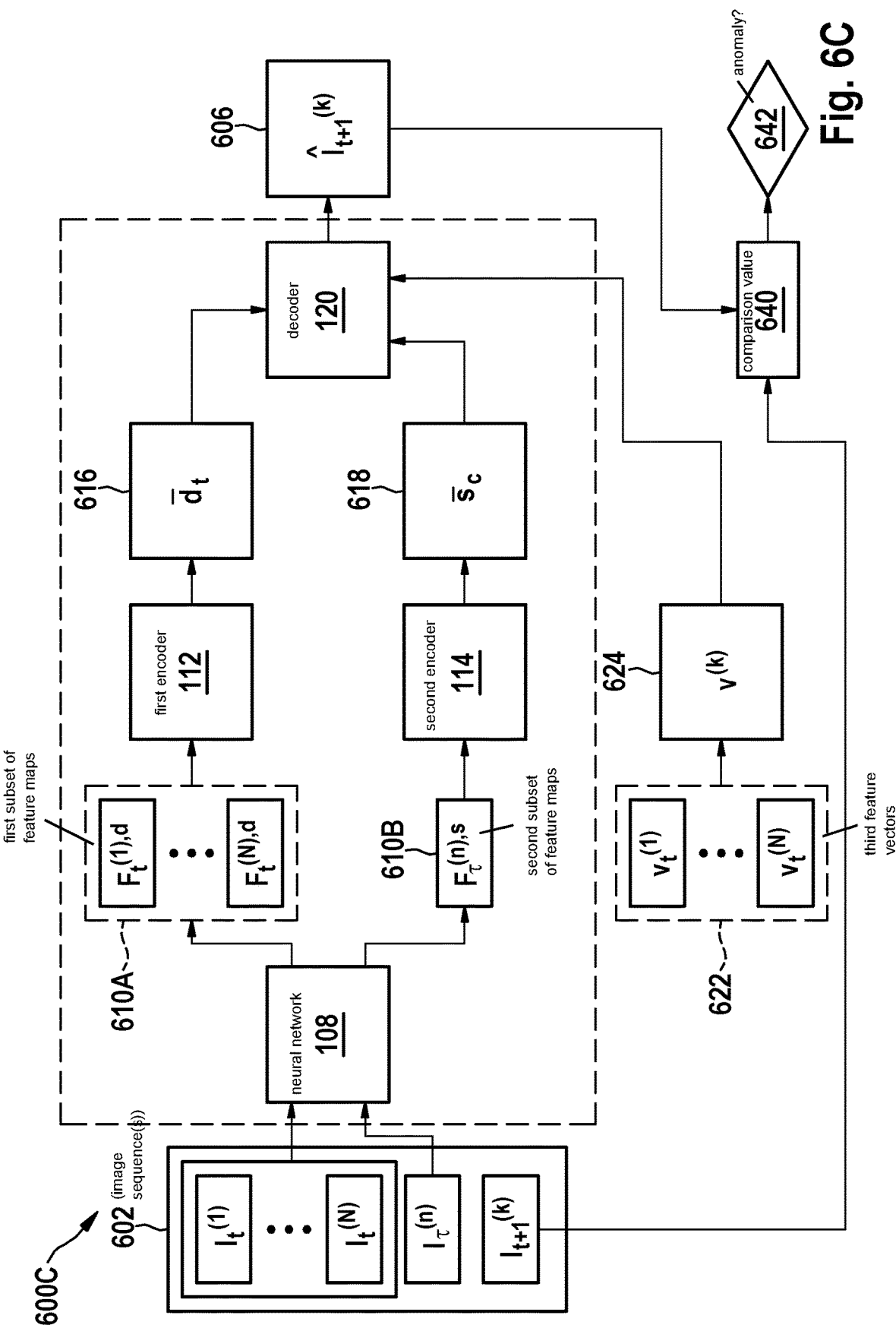

DEVICE AND METHOD FOR TRAINING AN IMAGE GENERATOR

FIELD

Various exemplary embodiments relate in general to a device and to a method for training an image generator.

BACKGROUND INFORMATION

Various image generators can for example process a digital input image and output a target image. However, this can be computationally complex, and can therefore require a high cost outlay and/or time outlay. Therefore, it may be required to provide an image generator that is capable of producing a target image for an input image with a reduced computational outlay. In addition, the training of an image generator can require a high time outlay, for example if the training has to be supervised. Therefore, it may be further required to provide a method by which an image generator can be trained in an unsupervised manner.

The paper "Time-Contrastive Networks: Self-Supervised learning from Video," by P. Sermanet et al., in IEEE International Conference on Robotics and Automation, 2018 (referred to in the following as reference [1]), describes a time-contrastive network that trains a robot behavior using videos that show demonstrations of a user and that have been recorded from various perspectives.

SUMMARY

The method and the device having the features of present invention (first example and twenty-first example, respectively), enable an unsupervised training of an image generator. In addition, the method and the device make it possible to train an image generator in such a way that the trained image generator can produce a target image having a reduced computational outlay.

A method for training an image generator can include: provision of at least one image sequence that has an image for each time of a plurality of times; training of a first encoder, a second encoder, and a decoder by: for each of a plurality of times of the plurality of times: for the image assigned to the time of the at least one image sequence, production of a multiplicity of feature maps by a neural network in reaction to an input of the image into the neural network, and grouping the multiplicity of feature maps into a first subset and a second subset; supplying the first subset to the first encoder in order to produce a first feature vector for the image assigned to the time; supplying the second subset to the second encoder for the production of a second feature vector for the image assigned to the time; supplying the first feature vector and the second feature vector to the decoder for the production of a predicted target image;
    producing an error value, such that: the error value is smaller the greater a difference is between first feature vectors produced for images differing from one another of the at least one image sequence; the error value is smaller the smaller a difference is between second feature vectors produced for images differing from one another of the at least one image sequence; the error value has a reconstruction error between the target image predicted by the decoder for a respective image of the at least one image sequence and a reference target image; and adapting the first encoder, the second encoder, and the decoder in order to reduce the error value. The method having the features described in this paragraph forms a first example embodiment of the present invention.

The term "image generator," as used herein, can be any type of algorithm based on mathematical logic that outputs a target image in reaction to an input of one or more images, using the algorithm. An image generator can include one or more models that can be trained using machine learning. A model can be or include for example a neural network, an encoder, a decoder, etc. A neural network, as used herein, can include or be any type of neural network, such as for example an autoencoder network, a convolutional neural network (CNN), a variational autoencoder network (VAE), a sparse autoencoder network (SAE), a recurrent neural network (RNN), a deconvolutional neural network (DNN), a generative adversarial network (GAN), a forward-thinking neural network, a sum-product neural network, etc. The neural network can have any number of layers and the trained neural network can have been trained using any type of training design, such as back-propagation. An encoder, as used herein, can be any type of algorithm based on mathematical logic that outputs a feature vector in reaction to an input of data, using the algorithm. A feature vector can be any type of data that describe features of one or more images in a compressed manner. A decoder, as used herein, can be any type of algorithm based on mathematical logic that outputs a target image in reaction to an input of one or more feature vectors, using the algorithm. A decoder can be for example any type of deconvolutional neural network. A decoder can for example have a DCGAN (deep convolutional generative adversarial network) architecture. A neural network (e.g. an encoder, e.g. a decoder) can have a DCGAN architecture. A neural network (e.g. an encoder, e.g. a decoder) can have a DCGAN architecture having a CoordConv modification.

The error value can have a temporal loss of contrast between first feature vectors produced for images differing from one another, and/or can have a temporal loss of contrast between a second feature vector produced for an image of the at least one image sequence and a second feature vector produced for a reference image of one or more provided reference images. The features described in this paragraph in combination with the first example form a second example embodiment of the present invention.

The error value can be an overall error value. The production of the error value can include: ascertaining a first multiplicity of anchor positive-negative triplets, each anchor positive-negative triplet of the first multiplicity of anchor positive-negative triplets: being assigned to a respective time; having, as anchor vector, a first feature vector produced by the first encoder for the first subset of feature maps of the image, assigned to the allocated time, of the at least one image sequence, having, as positive vector, a first feature vector produced by the first encoder for the first subset of feature maps of the image assigned to the preceding or following time of the assigned time, and having, as negative vector, a first feature vector for the first subset of feature maps of the image, assigned to a time differing from the assigned time, the preceding time, and the following time, of the at least one image sequence; ascertaining a first error value for the first multiplicity of anchor positive-negative triplets, the first error value correspondingly increasing, for each anchor positive-negative triplet, a distance measure according to a distance metric between the anchor vector and the positive vector, and correspondingly decreasing a distance measure according to the distance metric between the anchor vector and the negative vector;

ascertaining a second multiplicity of anchor positive-negative triplets, each anchor positive-negative triplet of the second multiplicity of anchor positive-negative triplets: being assigned to a respective time; having, as anchor vector, a second feature vector produced by the second encoder for the second subset of feature maps of a first image selected from the at least one image sequence; having, as positive vector, a second feature vector produced by the second encoder for the second subset of feature maps of a second image differing from the first image and selected from the at least one image sequence, having, as negative vector, a second feature vector produced by the second encoder for a reference image of one or more provided reference images; ascertaining a second error value for the second multiplicity of anchor positive-negative triplets, the second error value for each anchor positive-negative triplet correspondingly increasing a distance measure according to a distance metric between the anchor vector and the positive vector, and correspondingly reducing a distance measure according to the distance metric between the anchor vector and the negative vector; the overall error being ascertained by weighted summing of the first error value, the second error value, and the reconstruction error. The features described in this paragraph, in combination with the first example or with the second example, form a third example embodiment of the present invention.

The first encoder can be thereby trained in such a way that the first encoder learns dynamic (e.g. changing in a scene) features of the at least one image sequence. Clearly, the second encoder can thereby be trained in such a way that the second encoder learns static (e.g. not changing in the scene) features of the at least one image sequence.

The target image can be an image of the at least one image sequence following the image for which the first feature vector was produced by the first encoder. The features described in this paragraph, in combination with one or more of the first example through the third example, form a fourth example embodiment of the present invention.

The trained image generator can thereby predict an image that is to be expected in the future.

The network can have one or more layers of a neural network pre-trained for image processing. The features described in this paragraph, in combination with one or more of the first example through the fourth example, form a fifth example embodiment of the present invention.

The neural network can thereby be capable of recognizing features of images and describing them using the feature maps.

A method for video prediction can use an image generator trained according to one of the first example through the fifth example, where the target image can be an image of the at least one image sequence following the image for which the first feature vector was produced by the first encoder. The method can include: acquiring a current image of a video sequence; production, for the current image, of a first feature vector by the first encoder; production, for the current image or a previously acquired image of the video sequence, of a second feature vector by the second encoder; and prediction by the decoder of the next image, using the produced first feature vector and the produced second feature vector. The method having the features described in this paragraph forms a sixth example embodiment of the present invention.

In this way an image expected in the future of a video sequence can be predicted.

A method for detecting anomalies can use an image generator trained according to one of the first example through the fifth example, where the target image can be an image of the at least one image sequence following the image for which the first feature vector was produced by the first encoder. The method can include: acquiring a current image of a video sequence; for the current image, production of a first feature vector by the first encoder; for the current image or a previously acquired image of the video sequence, production of a second feature vector by the second encoder; prediction by the decoder of the next image using the produced first feature vector and the produced second feature vector; acquiring the next image; ascertaining a comparison value by comparing the next image with the predicted image; detecting an anomaly if the ascertained comparison value is smaller than a predefined threshold value. The method having the features described in this paragraph forms a seventh example embodiment of the present invention.

In this way an anomaly can be detected in a received image sequence (e.g., a video sequence).

The provision of at least one image sequence can include: providing a multiplicity of image sequences, each image sequence of the multiplicity of image sequences having a respective image for each time of the plurality of times, and a respective perspective of a multiplicity of perspectives of the same scene being assigned to each image sequence of the multiplicity of image sequences. The production of a multiplicity of feature maps by the neural network for the image, of the at least one image sequence, assigned to the time, and the grouping of the multiplicity of feature maps into a first subset and a second subset can include: for each of a number of times of the plurality of times: for each image assigned to the respective time of each image sequence of the multiplicity of image sequences, production of a respective multiplicity of feature maps by the neural network, and grouping the multiplicity of feature maps into a first subset and a second subset. The supplying of the first subset to the first encoder for the production of a first feature vector for the image assigned to the time can include: supplying the first subset of feature maps of all images assigned to the respective time to the first encoder for the production of the first feature vector for the images assigned to the time. The supplying of the second subset to the second encoder for the production of a second feature vector for the image assigned to the time can include: supplying the second subset of feature maps of all images assigned to the respective time to the second encoder for the production of the second feature vector for the images assigned to the time. The features described in this paragraph, in combination with one or more of the first example through the fifth example, form an eighth example embodiment of the present invention.

The respective anchor vector of each anchor positive-negative triplet of the first multiplicity of anchor positive-negative triplets can be selected from a first image sequence of the multiplicity of image sequences. The respective positive vector of each anchor positive-negative triplet of the first multiplicity of anchor positive-negative triplets can be selected from a second image sequence, differing from the first image sequence, of the multiplicity of image sequences, or the respective positive vector of each anchor positive-negative triplet of the first multiplicity of anchor positive-negative triplets can be selected for the image that is assigned to the time preceding or following the time assigned to the anchor positive-negative triplet. The first image can be selected from an image sequence of the multiplicity of image sequences. The second image can be selected from an image sequence of the multiplicity of image sequences. The features described in this paragraph, in combination with the third example and with the eighth example, form a ninth example embodiment of the present invention.

Such different angles of view on a scene can be used to train the first encoder for the learning of dynamic (e.g. changing in the scene) features and/or to train the second encoder for the learning of static (e.g. not changing in the scene) features.

The supplying of the first subset of feature maps of all images assigned to the respective time to the first encoder for the production of the first feature vector for the images assigned to the time can include: production, through application of a pooling method (e.g. max pooling, e.g. mean value pooling) to the first subset of feature maps, of a first set of pooling feature maps, each pooling feature map of the first set of pooling feature maps being assigned to a feature map of each first subset of feature maps, each feature of each pooling feature map being assigned to a respective feature of each feature map of the assigned feature maps, the respective feature of the pooling feature map having a maximum value or a mean value of the assigned features of the assigned feature maps; and producing the first feature vector using the pooling feature map. The features described in this paragraph, in combination with the eighth example or with the ninth example, form a tenth example embodiment of the present invention.

The supplying of the first subset of feature maps of all images assigned to the respective time to the first encoder for the production of the first feature vector for the images assigned to the time can include: selecting the first subset of feature maps of a partial set of the images of the time; production, by application of a pooling method to the first subset, assigned to the partial set, of feature maps, of a first set of pooling feature maps, each pooling feature map of the first set of pooling feature maps being assigned to a feature map of each first subset, assigned to the partial set, of feature maps, each feature of each pooling feature map being assigned to a respective feature of each feature map of the first subset, assigned to the partial set, of feature maps, the respective feature of the pooling feature map having a maximum value or a mean value of the assigned features of the assigned feature maps; and producing the first feature vector using the pooling feature map. The features described in this paragraph, in combination with the eighth example or with the ninth example, form an eleventh example embodiment of the present invention.

The supplying of the second subset of feature maps of all images assigned to the respective point to the second encoder for the production of the second feature vector for the images assigned to the time can include: production, by application of a pooling method to the second subset of feature maps, of a second set of pooling feature maps, each pooling feature map of the second set of pooling feature maps being assigned to a feature map of each second subset of feature maps, each feature of each pooling feature map being assigned to a respective feature of each feature map of the assigned feature maps, the respective feature of the pooling feature map having a maximum value or a mean value of the assigned features of the assigned feature maps; and production of the second feature vector using the pooling feature map. The features described in this paragraph, in combination with one or more of the eighth example through the eleventh example, form a twelfth example embodiment of the present invention.

The supplying of the second subset of feature maps of all images assigned to the respective time to the second encoder for the production of the second feature vector for the images assigned to the time can include: selection of the second subset of feature maps of a partial set of the images of the time; production, through application of a pooling method to the second subset, assigned to the partial set, of feature maps, of a second set of pooling feature maps, each pooling feature map of the second set of pooling feature maps being assigned to a feature map of each second subset, assigned to the partial set, of feature maps, each feature of the pooling feature map being assigned to a respective feature of each feature map of the second subset, assigned to the partial set, of feature maps, the respective feature of the pooling feature map having a maximum value or a mean value of the assigned features of the assigned feature maps; and production of the second feature vector using the pooling feature map. The features described in this paragraph, in combination with one or more of the eighth example through the eleventh example, form a thirteenth example embodiment of the present invention.

Using the pooling methods described herein, the first encoder and/or the second encoder can be trained in such a way that they are invariant with regard to perspective.

The error value can have a temporal loss of contrast between a second feature vector produced for an image of an image sequence of the multiplicity of image sequences and a second feature vector produced for a reference image of one or more provided reference images; the supplying of the first feature vector and of the second feature vector to the decoder for the production of a predicted target image can include: for each produced first feature vector, supplying of the first feature vector and of a second feature vector, selected from among the produced second feature vectors, to the decoder for the production of a predicted target image; for each predicted target image, ascertaining a reconstruction error between the predicted target image and the respective reference target image, the error value having the ascertained reconstruction error; and/or the training of the first encoder, the second encoder, and the decoder can include: provision of a different multiplicity of image sequences that show a scene different from the scene of the multiplicity of image sequences, each image sequence of the different multiplicity of image sequences having a respective image for each time of a different plurality of times; for one or more times of the different plurality of times, for each image, assigned to the respective time, of each image sequence of the different multiplicity of image sequences, production of a second feature vector by the second encoder; for each first feature vector produced for the multiplicity of image sequences, supplying the first feature vector of a second feature vector selected from among the second feature vectors produced for the different multiplicity of image sequences to the decoder for the production of a predicted target image; for each predicted target image, ascertaining by a discriminator of a discriminator error value for the predicted target image, the error value having the ascertained discriminator error values. The features described in this paragraph, in combination with one or more of the eighth example through the thirteenth example, form a fourteenth example embodiment of the present invention.

The grouping of the multiplicity of feature maps into a first subset and a second subset can include: grouping of the multiplicity of feature maps into a first subset, a second subset, and a third subset. The training of the first encoder, the second encoder, and the decoder can include a training of the first encoder, the second encoder, a third encoder, and the decoder. The method can further include: for each image sequence of the multiplicity of image sequences: for each image of the image sequence, supplying the third subset of the image to the third encoder for the production of a third feature vector to which the respective perspective of the image sequence assigned to the image is assigned. The supplying of the first feature vector and of the second feature vector to the decoder for the production of a predicted target image can include: supplying the first feature vector, the second feature vector, and a third feature vector selected from among the produced third feature vectors to the decoder for the production of the predicted target image from the perspective assigned to the third feature vector. The adaptation of the first encoder, the second encoder, and the decoder for the reduction of the error value can include an adaptation of the first encoder, the second encoder, the third encoder, and the decoder for the reduction of the error value. The features described in this paragraph, in combination with one or more of the eighth example through the fourteenth example, form a fifteenth example embodiment of the present invention.

The third encoder can learn a representation of the respective perspective. For example, the first encoder can learn dynamic features of the scene, the second encoder can learn static features of the scene, and the third encoder can learn an angle of view (a perspective) on the scene.

The target image can be the image for which the first feature vector was produced by the first encoder. The features described in this paragraph, in combination with the fifteenth example, form a sixteenth example embodiment of the present invention.

In this way, using a respective third feature vector, a scene shown in the image can be represented from a different angle of view.

A method for training an image generator can include: provision of a multiplicity of image sequences, each image sequence of the multiplicity of image sequences having a respective image for each time of the plurality of times, and a respective perspective of a multiplicity of perspectives of the same scene being assigned to each image sequence of the multiplicity of image sequences; training of a first encoder, a second encoder, a third encoder, and a decoder by: for each of a number of times of the plurality of times: for each of a number of times of the plurality of times: for each image, assigned to the respective time, of each image sequence of the multiplicity of image sequences, production of a respective multiplicity of feature maps by the neural network, and grouping of the multiplicity of feature maps into a first subset, a second subset, and a third subset; supplying the first subset of feature maps of all images assigned to the respective time to the first encoder for the production of the first feature vector for the images assigned to the time; supplying the second subset of feature maps of all images assigned to the respective time to the second encoder for the production of the second feature vector for the images assigned to the time; for each image sequence of the multiplicity of image sequences: for each image of the image sequence, supplying of the third subset of the image to the third encoder for the production of a third feature vector to which the respective perspective of the image sequence assigned to the image is assigned; for each third feature vector of the produced third feature vectors, supplying the first feature vector, the second feature vector, and the third feature vector to the decoder for the production of a predicted target image from the perspective supplied to the third feature vector; production of an error value: the error value being smaller the greater a difference is between first feature vectors produced for images, different from one another, of the at least one image sequence; the error value being smaller the smaller a difference is between second feature vectors produced for images, different from one another, of the at least one image sequence; the error value having a reconstruction error between the target image predicted by the decoder for a respective image of the at least one image sequence and a reference target image; adapting the first encoder, the second encoder, the third encoder, and the decoder in order to reduce the error value. The method having the features described in this paragraph forms a seventeenth example embodiment of the present invention.

The method can in addition include: for each image sequence of the multiplicity of image sequences, production of at least one third feature vector using a respective image of the image sequence. The features described in this paragraph, in combination with one or more of the eighth example through the seventeenth example, form an eighteenth example embodiment of the present invention.

A method for the production of an image of a scene having a perspective selected from the multiplicity of perspectives, by an image generator trained according to the eighteenth example using one or more images that show the scene from a respective different perspective of the multiplicity of perspectives, can include: production of a first feature vector for the one or more images by the first encoder; production of a second feature vector for the one or more images by the second encoder; production by the decoder of the image having the selected perspective using the produced first feature vector, the produced second feature vector, and a third feature vector assigned to the selected perspective. The method having the features described in this paragraph forms a nineteenth example embodiment of the present invention.

A method for the production of an image sequence that shows a scene from a perspective selected from the multiplicity of perspectives by an image generator trained according to the eighteenth example, using one or more image sequences that show the scene from a respective different perspective of the multiplicity of perspectives and that have a respective image for each time of a plurality of times, can include: for each time of the plurality of times: for each image, assigned to the respective time, of each image sequence of the one or more image sequences, production of a first feature vector by the first encoder; for at least one time of the plurality of times: for each image, assigned to the time, of each image sequence of the one or more image sequences, production of a second feature vector by the second encoder; production, by the decoder, of the image sequence with the selective perspective using the produced first feature vectors, the second feature vector produced for the at least one time, and a third feature vector assigned to the selected perspective. The method having the features described in this paragraph forms a twentieth example embodiment of the present invention.

In this way an image, or an image sequence, can be represented from a different perspective. In an example, using two video sequences that show a scene from two different angles of view, a third video sequence can be produced that shows the scene from a third angle of view that is different from the other two angles of view.

A computer program product can store program instructions that, when executed, carry out the method according to one or more of the first example through the twentieth example embodiment of the present invention. The computer program product having the features described in this paragraph forms a twenty-second example embodiment of the present invention.

A nonvolatile storage medium can store program instructions that, when executed, carry out the method of one or more of the first example through the twentieth example. The nonvolatile storage medium having the features described in this paragraph forms a twenty-third example embodiment of the present invnetion.

A nonvolatile storage medium can store program instructions that, when executed, carry out the method of one or more of the first example through the twentieth example. The nonvolatile storage medium having the features described in this paragraph forms a twenty-fourth example embodiment of the present invention.

A computer program can include instructions that, when executed by a processor, bring it about that the processor carries out a method according to one or more of the first example through the twentieth example. The computer program having the features described in this paragraph forms a twenty-fifth example embodiment of the present invention.

A computer-readable medium can store instructions that, when executed by a processor, bring it about that the processor carries out a method according to one or more of the first example through the twentieth example. The computer-readable medium having the features described in this paragraph forms a twenty-sixth example embodiment of the present invention.

Exemplary embodiments of the present invention are shown in the figures and are explained in more detail in the following description.

BRIEF DESCRIPTION OF THE DRAWINGS

FIGS. 1A and 1B each show an image generator system according to different specific embodiments of the present invention.

FIGS. 2A and 2B each show a processing system for training an image generator according to different specific embodiments of the present invention.

FIGS. 4A and 4B each show an image generator according to different specific embodiments of the present invention.

FIG. 6A shows a processing system having an image generator for producing an image from a selected perspective according to various specific embodiments of the present invention.

FIG. 6C shows a processing system for anomaly detection according to various specific embodiments of the present invention.

DETAILED DESCRIPTION OF EXAMPLE EMBODIMENTS

Figure 1B:
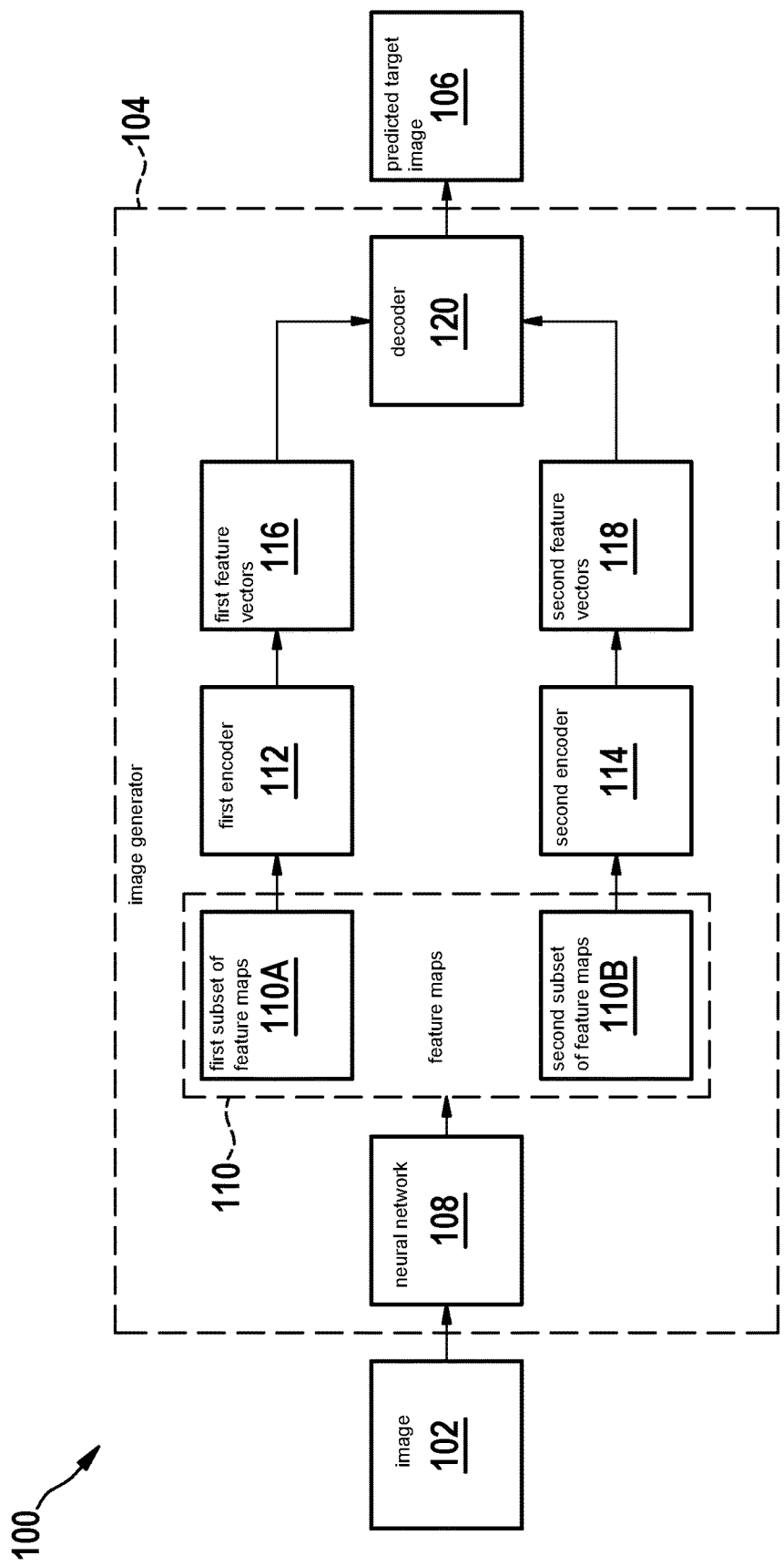

In a specific embodiment, a "computer" can be understood as any type of logic-implementing entity, which can be hardware, software, firmware, or a combination thereof. Therefore, in a specific embodiment a "computer" can be a hardwired logic circuit or a programmable logic circuit, such as a programmable processor, for example a microprocessor (e.g. a CISC (processor with large instruction set) or an RISC (processor with reduced instruction set)). A "computer" can have one or more processors. A "computer" can also be software that is implemented or executed by a processor, for example any type of computer program, for example a computer program that uses a virtual machine code, such as Java. Any other type of implementation of the respective functions described in more detail in the following can be understood, in agreement with an alternative specific embodiment, as a "computer."

Images can be produced by various image generators. This can be computationally complex, and can therefore require a high cost outlay and/or a high time outlay. The training of image generators can also require a high outlay (e.g. time outlay), for example in the case of supervised learning. Various exemplary embodiments relate to a device and to a method for training an image generator in such a way that the trained image generator is capable of producing images with a reduced computational outlay. In addition, various exemplary embodiments relate to a device and to a method for unsupervised training of an image generator.

FIG. 1A shows an image generator system 100 according to various specific embodiments. Image generator system 100 can have an image generator 104. Image generator 104 can be set up to produce, in reaction to an input of one or more images, such as image 102, a predicted target image 106. Clearly, image generator 104 can produce (e.g. generate) the predicted target image 106 for the image 102. Image generator 104 can for example be a trained image generator.

The term "image," as used herein, can be any type of digital image data that can represent a graphic representation, such as a digital RGB image, a digital RGB-D image, a binary image, a 3D image, a point cloud, a time series, a semantic segmentation image, etc.

According to various specific embodiments, an image, such as image 102, can be provided by one or more sensors. For example, the one or more sensors can include an imaging sensor, such as a camera (e.g. a standard camera, a digital camera, an infrared camera, a stereo camera, etc.), a video sensor (e.g. a video camera), a radar sensor, a lidar sensor, an ultrasonic sensor, etc. Clearly, a camera can provide for example an RGB image as image 102 and/or a lidar sensor can provide a point cloud as image 102. According to various specific embodiments, sensors of the one or more sensors can be smart sensors that provide preprocessed image data as image 102.

According to various specific embodiments, image 102 and predicted target image 106 can have the same type of digital image data. For example, image 102 and predicted target image 106 can each be an RGB image.

According to various specific embodiments, image 102 and predicted target image 106 can have types of digital image data different from one another. For example, image 102 can be a semantic segmentation image and predicted target image 106 can be an RGB image. For example, image 102 can be a point cloud and predicted target image 106 can be an RGB image. For example, image 102 can be an RGB image and predicted target image 106 can be a segmentation image. In this case, image generator 104 can be set up to classify a digital image (e.g. to carry out semantic segmentation, e.g. to detect objects). Clearly, image generator 104 can be, according to various specific embodiments, an image classifier.

Image generator system 100 can include a computer. The computer can be set up to carry out the processings described herein. For example, the computer can be set up to implement image generator 104. As described above, the computer can be any type of circuit, i.e. any type of logic-implementing entity. The computer can be for example a graphics processor (GPU), and the graphics processor can use an allocated graphics memory (video RAM) in the data processing. Image generator system 100 can in addition have a storage device. The storage device can have at least one memory. The memory can for example be used in the processing carried out by the computer. A memory used in the specific embodiments can be a volatile memory, for example a DRAM (dynamic random access memory) or a nonvolatile memory, for example a PROM (programmable read-only memory), an EPROM (erasable PROM), and E EEPROM (electrically erasable PROM), or a flash memory, such as a storage device having a floating gate, a charge-trapping storage device, an MRAM (magnetoresistive random access memory), or a PCRAM (phase change random access memory). The storage device can be set up to store provided digital image data (e.g. image 102). The storage device can be set up to store produced digital image data (e.g. the predicted target image 106). According to various specific embodiments, the storage device can store image generator 104 and the computer can implement image generator 104 using the storage device.

FIG. 1B shows image generator system 100 according to various specific embodiments. Image generator 104 can include a neural network 108 (e.g. a convolutional neural network). Neural network 108 can be implemented for example by the computer. Neural network 108 can for example be a pre-trained neural network. According to various specific embodiments, neural network 108 can include one or more layers of a neural network pre-trained for image processing (e.g. image classification, e.g. image segmentation, e.g. regression, etc.). Here, neural network 108 can include one or more layers of the pre-trained network, beginning with the first layer of the neural network. As an example, a neural network (e.g. a residual network, ResNet, e.g. a network of the Visual Geometry Group, VGGNet) can have nineteen layers, and neural network 108 can have the first fifteen layers of the neural network. According to various specific embodiments, neural network 108 can for example have a number between 40% and 90% of the layers of a pre-trained neural network, beginning with the first layer of the network.

According to various specific embodiments, neural network 108 can be set up to produce a multiplicity of feature maps 110 in reaction to an input of image 102 into neural network 108. According to various specific embodiments, image generator 104 can be set up (e.g. by the computer) to group the multiplicity of feature maps 110 (i.e. to arrange them in groups, e.g. to partition them). Image generator 104 can be set up to group the multiplicity of feature maps 110 into a first subset of feature maps 110A and a second subset of feature maps 110B. Clearly, the multiplicity of feature maps 110 can have a first subset of feature maps 110A and a second subset of feature maps 110B. According to various specific embodiments, neural network 108 can be set up such that a predefined number of feature maps is produced as a multiplicity of feature maps 110. The multiplicity of feature maps 110 can have a plurality of disjoint partial sets, where a first disjoint partial set can form the first subset of feature maps 110A and a second disjoint partial set can form the second subset of feature maps 110B. The number of feature maps of the first subset of feature maps 110A can for example correspond to the number of feature maps of the second subset of feature maps 110B.

According to various specific embodiments, image generator 104 can have a first encoder 112. The computer can be set up to implement first encoder 112. First encoder 112 can be set up to process the first subset of feature maps 110A and to produce a first feature vector 116 in reaction to an input of the first subset of feature maps 110A. First encoder 112 can be set up to process a concatenation of the feature maps of the first subset of feature maps 110A. Clearly, the feature maps of the first subset of feature maps 110A can be linked in the direction of a channel of the feature maps.

According to various specific embodiments, image generator 104 can have a second encoder 114. The computer can be set up to implement second encoder 114. Second encoder 114 can be set up to process the second subset of feature maps 110B and to produce a second feature vector 118 in reaction to an input of the second subset of feature maps 110B. Second encoder 114 can be set up to process a concatenation of the feature maps of the second subset of feature maps 110B. Clearly, the feature maps of the second subset of feature maps 110B can be linked in the direction of a channel of the feature maps.

According to various specific embodiments, image generator 104 can have a decoder 120. The computer can be set up to implement decoder 120. Decoder 120 can be set up to process first feature vector 116 and second feature vector 118. Decoder 120 can be set up to produce predicted target image 106 in reaction to an input of first feature vector 116 and second feature vector 118 into decoder 120. According to various specific embodiments, decoder 120 can be set up to process a concatenation of first feature vector 116 and of second feature vector 118 and to produce, for this concatenation, the predicted target image 106.

FIG. 2A shows a processing system 200 for training an image generator, such as image generator 104, according to various specific embodiments. The training of image generator 104 can include a training of first encoder 112, second encoder 114, and/or decoder 120.

According to various specific embodiments, at least one image sequence 202 can be provided (e.g. by the one or more sensors). For example, the one or more sensors can include a video sensor, and image sequence 202 can be a video sequence. For example, the one or more sensors can include a camera, and image sequence 202 can include a plurality of images recorded one after the other by the camera. Image sequence 202 can be a temporal sequence of images. According to various specific embodiments, for each time t of a plurality of times t=1-T image sequence 202 can have a respectively assigned image $I_t$. For example, image sequence 202 can have, at time t=1, the assigned image $I_1$, and for example image sequence 202 can have, at time t=2, the assigned image $I_2$, etc.

According to various specific embodiments, image generator 104 (e.g. first encoder 112, e.g. second encoder 114, e.g. decoder 120) can be trained for each of a number of times of the plurality of times t=1-T. For example, image generator 104 can be trained for each time t of the plurality of times t=1-T. Image generator 104 can be trained (e.g. adapted) for a time t of the plurality of times t=1-T in that image generator 114 processes the image $I_t$, assigned to time t, of image sequence 202 as described in the following:

According to various specific embodiments, neural network 108 can produce, for the image $I_t$, assigned to the respective time t, of image sequence 202, the multiplicity of feature maps 110 according to Equation (1):

$$F_t = h(I_t), \quad (1)$$

where h(•) is neural network 108 and $F_t$ is the multiplicity of feature maps 110 of image $I_t$ assigned to time t.

The multiplicity of feature maps $F_t$ 110 can include a plurality (e.g. a number P) of two-dimensional feature maps (for example having the dimensions M×M, for example having dimensions M×N, where M and N are whole numbers and N is different from M). In an example, the multiplicity of feature maps $F_t$ 110 can be described by $F_t \in \mathbb{R}^{P \times M \times M}$. The first subset of feature maps 110A can form a first disjoint partial set of the P two-dimensional feature maps, and the second subset of feature maps 110B can form a second disjoint partial set of the P two-dimensional feature maps. In an example, the number can be P=2F, and the first subset of feature maps 110A can have a number F of feature maps of the multiplicity of feature maps 110, and the second subset of feature maps 110B can have a number F of feature maps of the multiplicity of feature maps 110. For example, the first subset of feature maps 110A can be described by $F_t^d \in \mathbb{R}^{F \times M \times M}$, where d identifies the first subset. For example, the second subset of feature maps 110B can be described by $F_t^s \in \mathbb{R}^{F \times M \times M}$, where {s} identifies the second subset. It is to be noted that the multiplicity described in this paragraph of feature maps 110 is an illustrative example, and that the multiplicity of feature maps 110 can have any other type of dimensions and/or can be grouped in a different way into the first subset of feature maps $F_t^d$ 110A and the second subset of feature maps $F_t^s$ 110B.

For the first subset of feature maps $F_t^d$ 110A, first encoder 112 can produce the first feature vector 116 according to Equation (2):

$$d_t = f_d(F_t^d), \quad (2)$$

where $f_d(\bullet)$ is first encoder 112 and $d_t$ is first feature vector 116 at time t.

For the second subset of feature maps, $F_t^s$ 110B second encoder 114 can produce second feature vector 118 according to Equation (3):

$$s_t = f_s(F_t^s), \quad (3)$$

where $f_s(\bullet)$ is second encoder 114 and $s_t$ is second feature vector 118 at time t.

Decoder 120 can produce predicted target image 106 for first feature vector $d_t$ 116 and for second feature vector $s_t$ 118.

Clearly, in this way a respectively assigned predicted target image 106 can be produced for each of a number of times of the plurality of times t=1-T.

According to various specific embodiments, an error value 204 can be ascertained. Image generator 104 (e.g. first encoder 112, e.g. second encoder 114, e.g. decoder 120) can be trained to reduce error value 204.

Figure 2B:
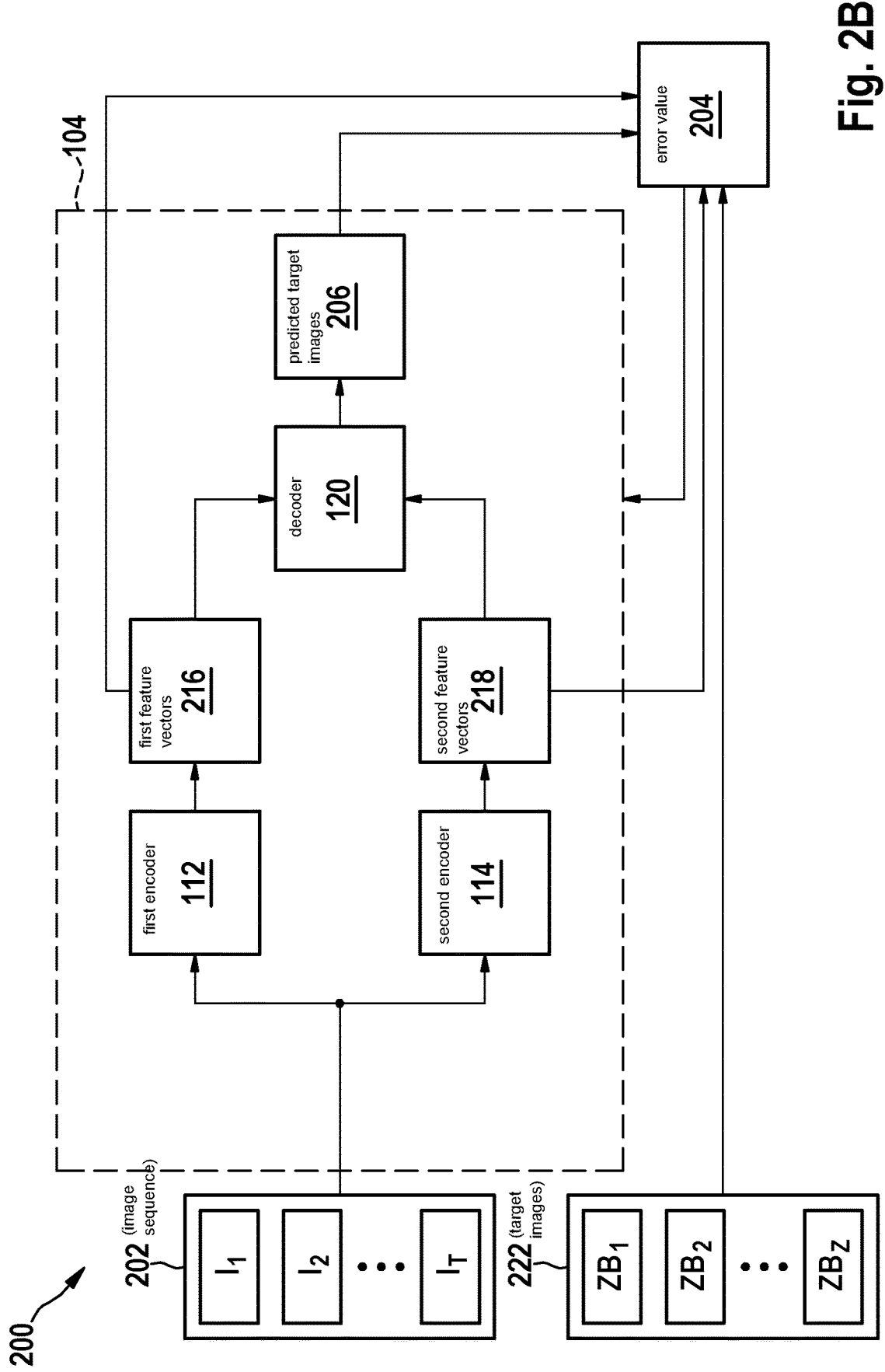

With reference to FIG. 2B, a multiplicity of first feature vectors 216 can be produced by first encoder 112 for the images $I_t$ assigned to the number of times of the plurality of times t=1-T. For example, for each time t of the plurality of times t=1-T, a respective first feature vector 116(t) can be produced, and the multiplicity of first feature vectors 216 can include all first feature vectors 116(t=1-T). According to various specific embodiments, a multiplicity of second feature vectors 218 can be produced by second encoder 114 for the images $I_t$ assigned to the number of times of the plurality of times t=1-T. For example, for each time t of the plurality of times t=1-T a respective second feature vector 118(t) can be produced, and the multiplicity of second feature vectors 218 can include all second feature vectors 118 (t=1-T).

Image generator 104 can produce a respective predicted target image 106(t) for each time t of the plurality of times for the image $I_t$ assigned to time t. For example, image generator 104 can produce a respective predicted target image 106(t) for each time t of the plurality of times t=1-T, for the image $I_t$ assigned to the time t, and all predicted target images 106(t=1-t) can form a multiplicity of predicted target images 206.

For each first feature vector of the multiplicity of first feature vectors 216, decoder 120 can produce an assigned predicted target image 106 of the multiplicity of predicted target images 206. According to various specific embodiments, a predicted target image 106 of the multiplicity of predicted target images 206 can be produced by supplying the assigned first feature vector and the second feature vector assigned to the time of the first feature vector into decoder 120. According to various specific embodiments, a predicted target image 106 of the multiplicity of predicted target images 206 can be produced by supplying to decoder 120 the assigned first feature vector and a second feature vector that is assigned to a time different from the time of the first feature vector. Clearly, a second feature vector of the second feature vectors can be selected for which the predicted target image assigned to the first feature vector is produced. According to various specific embodiments, one or more mean values can be ascertained of a respective plurality of second feature vectors. According to various specific embodiments, a predicted target image 106 of the multiplicity of predicted target images 206 can be produced by supplying the assigned first feature vector and a mean value of a plurality of second feature vectors to decoder 120.

For each time t of the plurality of times, image generator 104 can produce a respective predicted target image 106(t) for the image $I_t$ assigned to the time t. For example, for each time t of the plurality of times t=1-T, image generator 104 can produce a respective predicted target image 106(t) for the image $I_t$ assigned to the time t, and all the predicted target images 106(t=1-T) can form a multiplicity of predicted target images 206.

According to various specific embodiments, a target image, of a plurality of target images (ZB) 222(Z=1-Z) can be assigned to each predicted target image 106(t) of the multiplicity of predicted target images 206(t=1-T). Clearly, the multiplicity of predicted target images 206(t=1-T) can be assigned bijectively to the multiplicity of target images 222(z=1-Z). For example, the predicted target image 106 (t=1) can be assigned to the target image $ZB_{z=1}$; for example, the predicted target image 106(t=2) can be assigned to the target image $ZB_{z=2}$, etc. According to various specific embodiments, the multiplicity of target images 222 can be stored in the storage device. According to various specific embodiments, the at least one image sequence 202 can include the multiplicity of target images 222. In various exemplary embodiments, the predicted target image 106, produced by image generator 104 for the image $I_t$ assigned to a time t, can be assigned to the time t. For example, the predicted target image 106 can be a classification (e.g. semantic segmenting) of the image $I_t$ at time t. In this case, the target image (z) can include the classified image at time t, so that z=t. For example, the predicted target image 106 can show a perspective at time t differing from image $I_t$ (see for example FIG. 4B, FIG. 5, FIG. 6A). In this case, the target image (z) can have the different perspective at time t, so that z=t. In various exemplary embodiments, the predicted target image 106, produced by image generator 104 for the image $I_t$ assigned to a time t, can be assigned to a time t+n (e.g. t+1) following time t, so that z=t+n (e.g. z=t+1). Clearly, in this way, for an image $I_t$ a following image $I_{t+1}$ can be predicted (see for example FIG. 3A, FIG. 3B, FIG. 6B, FIG. 6C). In this case, the target image (z) can include the image $I_{t+1}$ at the following time t+1, where z=t+1.

According to various specific embodiments, error value 204 can be ascertained using the multiplicity of first feature vectors 216. Error value 204 can be smaller the larger a difference is between first feature vectors produced for images differing from one another of image sequence 202. A difference between two feature vectors, as described herein, can be ascertained corresponding to a distance measure according to a distance metric. A distance measure can for example be a similarity measure. The distance metric can for example be, or include, an L2 norm. According to various specific embodiments, error value 204 can include a temporal loss of contrast between first feature vectors produced for images of image sequence 202 differing from one another.

According to various specific embodiments, error value 204 can include a first error value $\mathcal{L}_{id}$.

First error value $\mathcal{L}_{id}$ can for example be a triplet error. First error value $\mathcal{L}_{id}$ can be ascertained using a first multiplicity of anchor positive-negative triplets. Each anchor positive-negative triplet of the first multiplicity of anchor positive-negative triplets can be assigned to a respective time t. Each anchor positive-negative triplet of the first multiplicity of anchor positive-negative triplets can have as anchor vector a first feature vector $d_t$ assigned to the respective time t. Each anchor positive-negative triplet of the first multiplicity of anchor positive-negative triplets can have as positive vector a first feature vector $d_{t\pm1}$ assigned to the preceding time t−1 or to the following time t+1, relative to the assigned time t (e.g. $d_{t+1}$ as positive vector, e.g. $d_{t-1}$ as positive vector). Each anchor positive-negative triplet of the first multiplicity of anchor positive-negative triplets can have as negative vector a first feature vector $d_{t\pm neg}$ that is assigned to a time t±neg, where neg≥2, that differs from the assigned time t, the preceding time t−1, and the following time t+1. According to various specific embodiments, the negative vector can be selected using neg≥2 for each anchor positive-negative triplet (e.g. randomly selected), such as within a predefined range $Neg_{min} \leq neg \leq Neg_{max}$. According to various specific embodiments, the first error value $\mathcal{L}_{id}$ for the first multiplicity of anchor positive-negative triplets can be ascertained in such a way that the first error value is increased for each anchor positive-negative triplet, corresponding to a distance measure according to a distance metric between the anchor vector and the positive vector. According to various specific embodiments, the first error value $\mathcal{L}_{id}$ for the first multiplicity of anchor positive-negative triplets can be ascertained in such a way that the first error value for each anchor positive-negative triplet is reduced corresponding to a distance measure according to a distance metric between the anchor vector and the negative vector.

According to various specific embodiments, the first error value $\mathcal{L}_{id}$ can be ascertained according to Equation (4):

$$\mathcal{L}_{id} = \sum_{i=1}^{|T_d|} \max[\|d_i^a - d_i^p\|_2^2 - \|d_i^a - d_i^n\|_2^2 + \gamma_d, 0], \quad (4)$$

where $\gamma_d$ is a predefined distance value and $\tau_d$ is the first multiplicity of anchor positive-negative triplets having the anchor positive-negative triplets i:, and where $d_i^a$ is the respective anchor vector, $d_i^p$ the respective positive vector, and $d_i^n$ is the respective negative vector of an anchor positive-negative triplet i:.

According to various specific embodiments, first encoder 112 can be trained for the reduction of the first error value $\mathcal{L}_{id}$. Clearly, in this way a difference between a first feature vector produced for a time t and a first feature vector produced for a preceding or following time t±1 can be reduced (e.g. minimized). Clearly, in this way a difference between a first feature vector produced for a time t and a first feature vector produced for a different time t±neg can be increased (e.g. maximized).

In this way, the first error value $\mathcal{L}_{id}$ become smaller the greater a difference is between first feature vectors produced for images that are different from one another. Clearly, first encoder 112 can in this way be trained in such a way that first encoder 112 learns dynamic features of image sequence 202. In this way, first encoder 112 can be trained in such a way that it learns differences in the features of the images of image sequence 202 and thus learns dynamic features of image sequence 202. Dynamic features of an image sequence can be for example object poses, changing colors of objects, changing positions of objects, etc.

According to various specific embodiments, error value 204 can be ascertained using the multiplicity of second feature vectors 218. Error value 204 can be smaller the smaller a difference is between second feature vectors produced for images differing from one another of image sequence 202. According to various specific embodiments, error value 204 can include a temporal loss of contrast between a second feature vector produced for an image of the at least one image sequence 202 and a second feature vector produced for a reference image of one or more provided reference images. The one or more reference images can show for example a scene different from image sequence 202. The one or more reference images can for example show a scene different from image sequence 202 in a field of view substantially corresponding to the image sequence.

According to various specific embodiments, error value 204 can include a second error value $\mathcal{L}_{is}$.

Second error value $\mathcal{L}_{is}$ can for example include a distance measure according to a distance metric between second feature vectors differing from one another. For example, second error value $\mathcal{L}_{is}$ can be smaller the smaller a difference is between second feature vectors differing from one another of image sequence 202. Clearly, in this way a difference between two second feature vectors of image sequence 202 can be penalized.

Second error value $\mathcal{L}_{is}$ can for example be a triplet error. Second error value $\mathcal{L}_{is}$ can be ascertained using a second multiplicity of anchor positive-negative triplets. Each anchor positive-negative triplet of the second multiplicity of anchor positive-negative triplets can be assigned to a respective time t. Each anchor positive-negative triplet of the second multiplicity of anchor positive-negative triplets can have as anchor vector a second feature vector $S_t$ assigned to the respective time t. Each anchor positive-negative triplet of the second multiplicity of anchor positive-negative triplets can have as positive vector a second feature vector $s_{t\pm pos}$ that is assigned to a time t±pos, where pos≥1, that is different from time t. According to various specific embodiments, the positive vector can be selected (e.g. randomly selected) by pos≥1 for each anchor positive-negative triplet, such as for example within a predefined range $Pos_{min} \leq pos \leq Pos_{max}$. Each anchor positive-negative triplet of the second multiplicity of anchor positive-negative triplets can have as negative vector a second feature vector that is produced for a reference image of the one or more reference images.

According to various specific embodiments, the second error value $\mathcal{L}_{is}$ can be ascertained for the second multiplicity of anchor positive-negative triplets in such a way that second error value $\mathcal{L}_{is}$ is increased for each anchor positive-negative triplet corresponding to a distance measure in accordance with a distance metric between the anchor vector and the positive vector. According to various specific embodiments, second error value $\mathcal{L}_{is}$ for the second multiplicity of anchor positive-negative triplets can be ascertained in such a way that second error value $\mathcal{L}_{is}$ is reduced for each anchor positive-negative triplet corresponding to a distance measure in accordance with the distance metric between the anchor vector and the negative vector.

According to various specific embodiments, second error value $\mathcal{L}_{is}$ can be ascertained according to Equation (5):

$$\mathcal{L}_{is} = \sum_{i=1}^{|\mathcal{T}_s|} \max[\|s_i^a - s_i^p\|_2^2 - \|s_i^a - s_i^n\|_2^2 + \gamma_s, 0], \quad (5)$$

where $\gamma_s$ is a predefined distance value and $\tau_s$ is the second multiplicity of anchor positive-negative triplets having the anchor positive-negative triplets i:, and where $s_i^a$ is the respective anchor vector, $s_i^p$ the respective positive vector, and $s_i^n$ is the respective negative vector of an anchor positive-negative triplet i:.

According to various specific embodiments, second encoder 114 can be trained for the reduction of second error value $\mathcal{L}_{is}$. Clearly, in this way a difference between a second feature value produced for a time t and a second feature value produced for a different time t±pos, where pos≥1, can be reduced (e.g. minimized). Clearly, in this way a difference between a second feature value produced for a time t and a second feature value produced for a reference image can be increased (e.g. maximized). In this way, second error value $\mathcal{L}_{is}$ becomes smaller the smaller difference is between second feature vectors produced for images differing from one another of image sequence 202. For example, second error value $\mathcal{L}_{is}$ becomes smaller the greater a difference is between second feature values produced for images of image sequence 202 and second feature vectors produced for reference images. Clearly, second encoder 114 can in this way be trained in such a way that second encoder 114 learns static features of image sequence 202. In this way, second encoder 114 can be trained in such a way that it learns these common elements in the features of the images of image sequence 202, and thus learns static features of image sequence 202. Static features of an image sequence can be for example static objects, non-changing colors of objects, a background, object shapes, a non-changing number of objects, etc.

Clearly, the latent space described by the first feature vector and the second feature vector can be divided into dynamic features of image sequences, described by the first feature vector, and static features of image sequences, described by the second feature vector. Clearly, in this way, a trained image generator 104 can require a reduced computational outlay as a result of this partitioning of the features as described herein.

According to various specific embodiments, error value 204 can be ascertained using the multiplicity of target images 222(z=1-Z). Error value 204 can have, for each predicted target image of the multiplicity of predicted target images 206, a reconstruction error (e.g. a reconstruction error value) between the respective predicted target image and the target image 222(z), assigned to the predicted target image, of the multiplicity of target images 222(z=1-Z). The reconstruction error between the respective predicted target image and the target image 222(z) assigned to the predicted target image can be ascertained for example using the L2 norm. An overall reconstruction error $\mathcal{L}_{vr}$ can include the reconstruction errors for all predicted target images of the multiplicity of predicted target images 206. According to various specific embodiments, the overall reconstruction error $\mathcal{L}_{vr}$ can be ascertained according to Equation (6):

$$\mathcal{L}_{vr} = \frac{1}{T}\sum_{t=1}^{T} \|I_z - \hat{I}_t\|_2^2, \quad (6)$$

where T is the number of times of the plurality of times, $\hat{I}_t$ is the target image predicted for a respective time t, and $I_z$ is the target image assigned to the respective predicted target image. Here, for example it can be that z=t, so that the target image is the image of the at least one image sequence 202 at time t. According to various specific embodiments, for example it can be that z=t+1, so that the target image is the image of the at least one image sequence 202 at the following time t+1. The overall reconstruction error $\mathcal{L}_{vr}$ can have an overall reconstruction error value. According to various specific embodiments, decoder 120 can be trained to reduce the overall reconstruction error $\mathcal{L}_{vr}$.

As described herein, a predicted target image 106 of the multiplicity of predicted target images 206 can be produced by supplying the assigned first feature vector and a second feature vector that is assigned to a time differing from the time of the first feature vector, or that has a mean value of a plurality of second feature vectors, to decoder 120. Clearly, a second feature vector of the second feature vectors can be selected for which the predicted target image assigned to the first feature vector is produced. Clearly, in this way dynamic features (e.g. changing features of the assigned images) of the second feature vectors can result in a larger reconstruction error of the respective predicted target images. Second encoder 114 can be trained using overall reconstruction error $\mathcal{L}_{vr}$. Clearly, in this way second encoder 114 can be trained in such a way that second encoder 114 learns static features of image sequence 202, and dynamic features are not taken into account.

According to various specific embodiments, error value 204 can be an overall error value $\mathcal{L}$. Overall error value $\mathcal{L}$ can be ascertained by weighted summing of first error value $\mathcal{L}_{id}$, second error value $\mathcal{L}_{is}$, and the overall reconstruction error value $\mathcal{L}_{vr}$ according to Equation (7):

$$\mathcal{L} = \lambda_{is}\mathcal{L}_{is} + \lambda_{id}\mathcal{L}_{id} + \lambda_{vr}\mathcal{L}_{vr}, \quad (7)$$

where $\lambda_{is}$, $\lambda_{id}$ and $\lambda_{vr}$ are weighting factors.

According to various specific embodiments, first encoder 112, second encoder 114, and/or decoder 120 can be trained for the reduction (e.g. minimization) of the overall error value. According to various specific embodiments, first encoder 112, second encoder 114, and decoder 120 can be trained for the reduction of the overall error value.

Figure 3A:
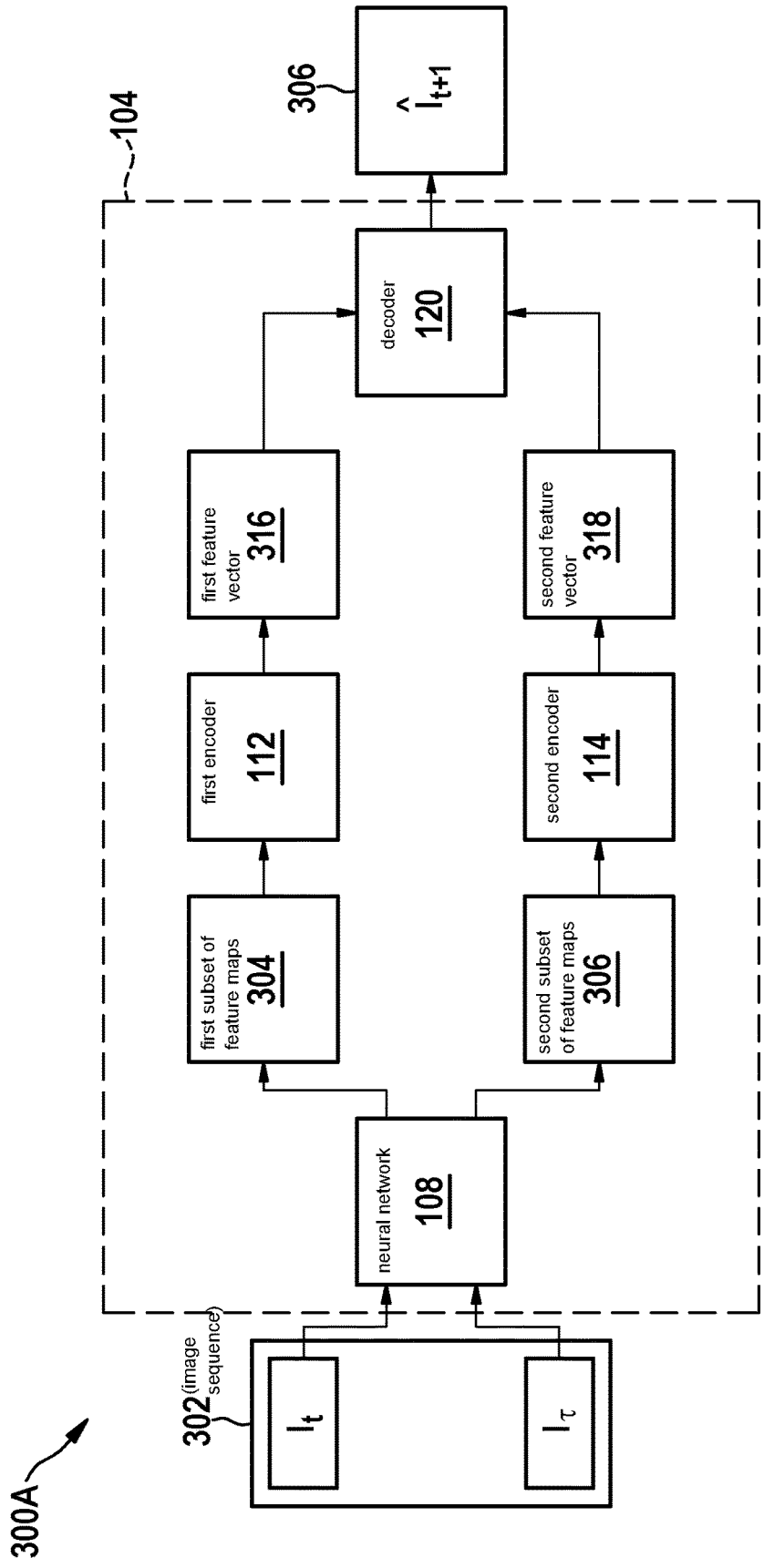
FIG. 3A shows a processing system for video prediction according to different specific embodiments of the present invention.

FIG. 3A shows a processing system 300A for video prediction according to various specific embodiments. Processing system 300A can include image generator 104. According to various specific embodiments, image generator 104 can have been trained corresponding to the description relating to FIG. 2A and FIG. 2B, image generator 104 having been trained in such a way that target image 106(z), predicted for the image $I_t$ assigned to a time t is assigned to a time t+1 following time t, so that z=t+1.

According to various specific embodiments, an image sequence 302 can be supplied to image generator 104. For an image $I_t$ of image sequence 302 assigned to a respective time t, neural network 108 can produce a first subset of feature maps 304. For an image $I_τ$ of image sequence 302 assigned to a time τ, neural network 108 can produce a second subset of feature maps 306. According to various specific embodiments, the time t can be assigned to a current image of image sequence 302 (e.g. of a video sequence). For example, image sequence 302 can be streamed. For example, a respective image of image sequence 302 can be a frame of the image sequence. The image $I_τ$ of image sequence 302 assigned to time τ can be a preceding image (e.g., a previously acquired image) of image sequence 302 (i.e. τ<t). The image $I_τ$ assigned to time τ can be the image $I_t$ of image sequence 302 assigned to time t (i.e. τ=t). Clearly, an image of a video sequence can be continuously acquired, the second subset of feature maps 306 being produced by neural network 108 for an already-acquired image of the video sequence, the first subset of feature maps 304 being produced by neural network 108 for an image (e.g. a current image) of the video sequence acquired at a respective time.

According to various specific embodiments, first encoder 112 can produce a first feature vector 316 for the first subset of feature maps 304. Second encoder 114 can produce a second feature vector 318 for the second subset of feature maps 306.

According to various specific embodiments, decoder 120 can produce a predicted target image 306 for the first feature vector 316 and the second feature vector 318. The predicted target image 306 can be the predicted next image $\hat{I}_{t+1}$ of image sequence 302 (e.g. the predicted next image of the video sequence).

Clearly, for an image sequence (e.g. a video sequence) image generator 104 can predict a next image of the image sequence on the basis of a current image.

Figure 3B:
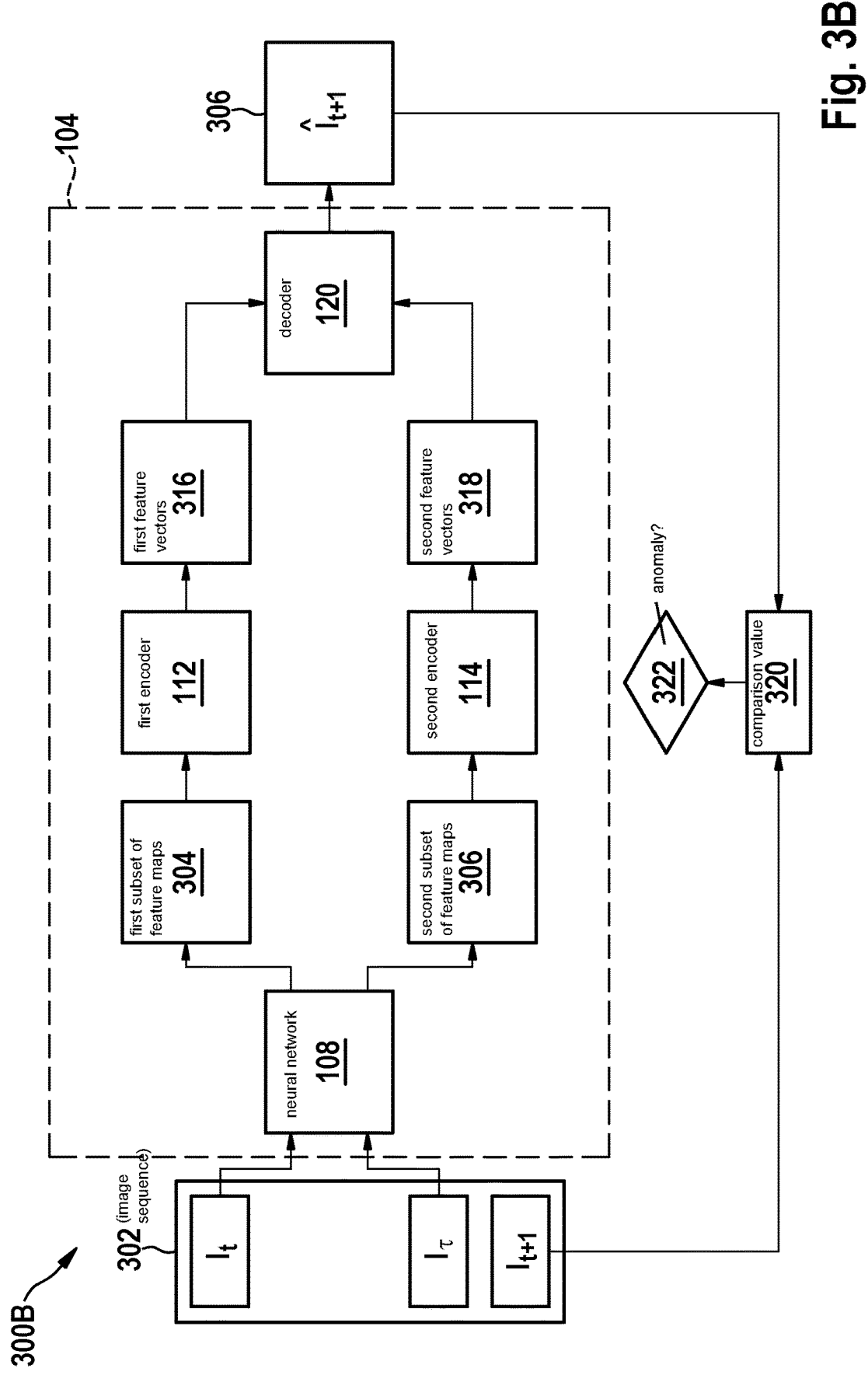
FIG. 3B shows a processing system for anomaly detection according to different specific embodiments of the present invention.

FIG. 3B shows a processing system 300B for anomaly detection according to various specific embodiments. Processing system 300B can substantially correspond to processing system 300A, the next image $I_{t+1}$ of image sequence 302 additionally being acquired. According to various specific embodiments, the computer can be set up to compare the acquired next image $I_{t+1}$ with the predicted next image $\hat{I}_{t+1}$. According to various specific embodiments, the computer can be set up to ascertain a comparison value 320 between the acquired next image $I_{t+1}$ and the predicted next image $\hat{I}_{t+1}$. According to various specific embodiments, the computer can be set up to ascertain (e.g. to detect) an anomaly 322 if the ascertained comparison value 320 is less than a predefined threshold value. The predefined threshold value can for example be stored in the storage device. Clearly, the comparison value 320 can indicate to what extent (e.g. what percent) the acquired next image $I_{t+1}$ and the predicted next image $\hat{I}_{t+1}$ agree. Clearly, the computer can detect an anomaly if a deviation of the acquired next image $I_{t+1}$ from the predicted next image $\hat{I}_{t+1}$ becomes too great (in such a way that comparison value 320 is below the predefined threshold value).

FIG. 4A shows image generator 104 according to various specific embodiments. According to various specific embodiments, decoder 120 of image generator 104 can be set up to produce predicted target image 106 in reaction to an input of first feature vector 116, second feature vector 118, and a third feature vector 122. According to various specific embodiments, decoder 120 can be set up to process a concatenation of first feature vector 116, second feature vector 118, and third feature vector 122, and, for this concatenation, to produce the predicted target image 106. According to various specific embodiments, third feature vector 122 can be stored in the storage device.

Figure 4B:
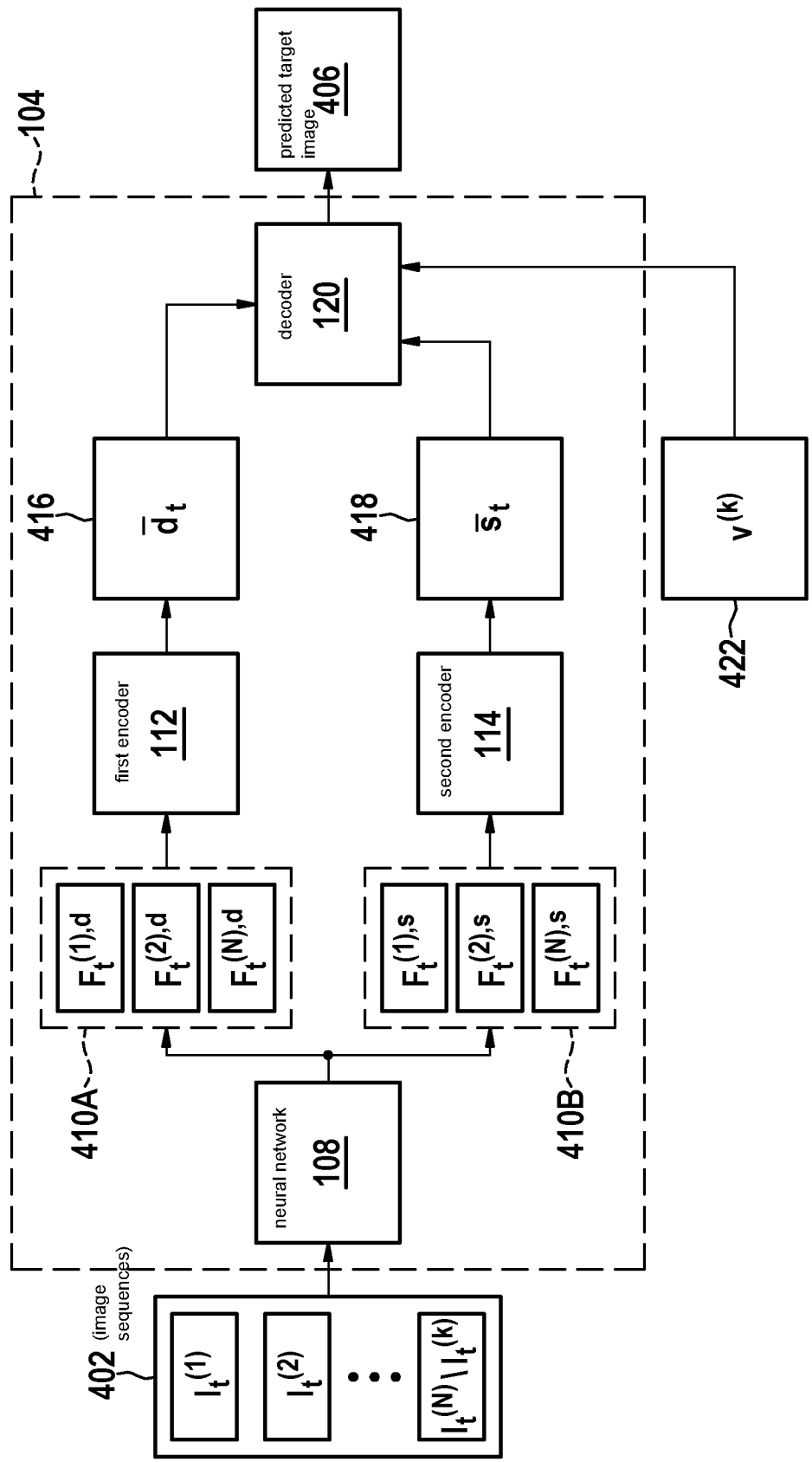

FIG. 4B shows image generator 104 according to various specific embodiments. According to various specific embodiments, a multiplicity of image sequences 402 can be provided (e.g. from various sensors). The image sequences of the multiplicity of image sequences 402 can be stored in the storage device. For example, the multiplicity of image sequences 402 can include a number of N image sequences, where N can be a whole number greater than 1. Each image sequence of the multiplicity of image sequences 402 can be a temporal sequence of images. According to various specific embodiments, each image sequence 402(n) of the multiplicity of image sequences 402(n=1-N) can have, for each time t of a plurality of times t=1-T, a respective assigned image $I_t^{(n)}$. According to various specific embodiments, the image sequences of the multiplicity of image sequences 402(n=1-N) can show the same scene from different perspectives. To each image sequence 402(n) of the multiplicity of image sequences 402(1-N) there can be assigned a respective perspective n of a multiplicity of perspectives 1–N. Clearly, each image sequence 402(n) of the multiplicity of image sequences 402(1-N) can show a different angle of view on the same scene.

According to various specific embodiments, the multiplicity of image sequences 402(1-N) can show the same scene from the multiplicity of perspectives 1–N, but not from the perspective k. Clearly, in this example no image sequence 402(n) of the multiplicity of image sequences 402(1-N) can include the perspective n=k. As an illustrative example, the multiplicity of image sequences 402(1-N) can show a scene from above (perspective n=1), from the right (perspective n=2), from the left (perspective n=3), from the rear (perspective n=4), and/or from the front (perspective n=5), but not from below (perspective n=k).

Clearly, to each time t there can be assigned a respective image $I_t^{(n)}$ from each image sequence 402(n) of the multiplicity of image sequences 402(1-N). According to various specific embodiments, neural network 108 can produce, for each of a number of times of the plurality of times t=1-T, for each image $I_t^{(n)}$, assigned to the time t, of each image sequence 402(n) of the multiplicity of image sequences 402(1-N), a respective multiplicity of feature maps having a respective first subset of feature maps 410A and a respective second subset of feature maps 410B. For example, neural network 108 can produce, for each image $I_t^{(n)}$, where n=1-T, a respective assigned first subset of feature maps $F_t^{(n),d}$ and a respective assigned second subset of feature maps $F_t^{(n),s}$.

According to various specific embodiments, first encoder 112 can be set up to produce, in reaction to an input of the first subset of feature maps 410A $F_t^{(n=1-N),d}$ of all images $I_t^{(n=1-N)}$ assigned to the respective time t into first encoder 112, a first feature vector $\bar{d}_t$ 416 for the images $I_t^{(n=1-N)}$ assigned to the time. Here the macron can indicate that the first feature vector $\bar{d}_t$ 416 is produced for the first subset of feature maps 410A $F_t^{(n=1-N),d}$ of one or more (e.g. all) images $I_t^{(n=1-N)}$ assigned to the respective time t.

According to various specific embodiments, image generator 104 can be set up to link (e.g. along the channel direction, e.g. by a concatenation) the feature maps $F_t^{(n=1-N),d}$, assigned to the respective time t, of the first subset of feature maps 410A. Clearly, each first subset of feature maps 410A can form a respective first feature map tensor $F_t^{(n),d} \in \mathbb{R}^{F \times M \times M}$. The linking (e.g. stacking, e.g. by concatenation) of the feature maps $F_t^{(n=1-N),d}$ of the first subset of feature maps 410A can be a linking of the first feature map tensors $F_t^{(n),d} \in \mathbb{R}^{F \times M \times M}$. For example, a linked first feature map tensor $F_t^d$ can be described by $F_t^d \in \mathbb{R}^{N \times F \times M \times M}$. According to various specific embodiments, the concatenation can be applied to a changing sequence of the first subsets of feature maps 410A. In this way, for example an invariance can be achieved with regard to the sequence of perspectives.

According to various specific embodiments, first encoder 112 can be set up to produce the first feature vector $\bar{d}_t$ 416 for the linked first feature map tensor $F_t^d$.

According to various specific embodiments, image generator 104 can be set up (e.g. by the computer, e.g. by a layer implemented in image generator 104 based on machine learning, such as a neural network layer, e.g. first encoder 112) to apply a pooling method to the linked first subset of feature maps. For example, image generator 104 can be set up to apply the pooling method to the linked first feature map tensor $F_t^d$. The pooling method can for example be a max pooling (a maximum pooling) or a mean value pooling (mean pooling). According to various specific embodiments, the pooling method can be applied to the N first feature map tensors $F_t^{(n),d} \in \mathbb{R}^{F \times M \times M}$ of the linked first feature map tensor $F_t^d \in \mathbb{R}^{N \times F \times M \times M}$. According to various specific embodiments, image generator 104 can be set up to produce a first set of pooling feature maps by applying the pooling method to the linked first feature map tensor $F_t^d \in \mathbb{R}^{N \times F \times M \times M}$. Clearly, in this way each pooling feature map of the first set of pooling feature maps can be assigned to a feature map of each first subset of feature maps 410A. For example, each feature of each pooling feature map can be assigned to a respective feature of a feature map of each assigned feature map. The respective feature of the respective pooling feature map can include a maximum value (e.g. in the case in which a max pooling is carried out) or a mean value (e.g. in the case in which a mean pooling is carried out) of the assigned features of all assigned feature maps. Clearly, in this way in each case a common first feature map can be produced for the respectively assigned feature maps of the various image sequences (and thus perspectives). In this way, the overall first feature map can be invariant with regard to perspective. In an illustrative example, it can be that N=3 and F=4, so that the linked first feature map tensor can be $F_t^d \in \mathbb{R}^{3 \times 4 \times M \times M}$. The pooling method can be applied to each of the 4 feature maps of the first subset of feature maps in relation to the N=3 perspectives, so that for each f∈F from the N=3 perspectives, a respective common first feature map can be produced, so that $F_t \in \mathbb{R}^{4 \times M \times M}$ can hold for all common first feature maps. According to various specific embodiments, first encoder 112 can be set up to produce first feature vector $\bar{d}_t$ 416 for the first set of pooling feature maps. The production of first feature vector $\bar{d}_t$ 416 can be described for example by Equation (8):

$$f_{d,max}(F_t^d), \qquad (8)$$

where max indicates, as an example, that a max pooling method is carried out.

According to various specific embodiments, the pooling method can be applied to the first subsets of feature maps of a partial set of the images $I_t^{(n=1-N)}$ of time t. Clearly, in this way the respective first subset of feature maps 410A of one or more perspectives n∈N can remain not taken into account. In an illustrative example, it can be that N=5 and F=4, so that the linked first feature map tensor can be $F_t^d \in \mathbb{R}^{5 \times 4 \times M \times M}$. The pooling method can for example be applied to each of the 4 feature maps of the first subset of feature maps for two, three, or four perspectives of the N=5 perspectives, so that at least one first subset of feature maps of a perspective is omitted. Clearly, in this way the pooling method can be combined with a dropout method. In this way, each produced common first feature map of the produced common first feature maps can be invariant with regard to the perspective.

According to various specific embodiments, second encoder 114 can be set up to produce a second feature vector $\bar{s}_t$ 418 in reaction to an input of the second subset of feature maps 410B, $F_t^{(n=1-N),s}$, of all images $I_t^{(n=1-N)}$ assigned to the respective time t into second encoder 114, for the images $I_t^{(n=1-N)}$ assigned to the time. Here, the macron can indicate that the second feature vector $\bar{s}_t$ 418 is produced for the second subset of feature maps 410B, $F_t^{(n=1-N),s}$ of one or more (e.g. all) images $I_t^{(n=1-N)}$ assigned to the respective time t.

According to various specific embodiments, image generator 104 can be set up to link (e.g. along the channel direction, e.g. by a concatenation) the feature maps $F_t^{(n=1-N),s}$, assigned to the respective time t, of the second subset of feature maps 410B. Clearly, each second subset of feature maps 410B can form a respective second feature map tensor $F_t^{(n),s} \in \mathbb{R}^{F \times M \times M}$. The linking (e.g. stacking, e.g. by concatenation) of the feature maps $F_t^{(n=1-N),s}$ of the first subset of feature maps 410B can be a linking of the second feature map tensors $F_t^{(n),s} \in \mathbb{R}^{F \times M \times M}$. For example, a linked second feature map tensor $F_t^s$ can be described by $\bar{F}_t^s \in \mathbb{R}^{N \times F \times M \times M}$. According to various specific embodiments, the concatenation can be applied to a changing sequence of the second subsets of feature maps 410B. In this way, for example an invariance can be achieved with regard to the sequence of perspectives.

According to various specific embodiments, first encoder 112 can be set up to produce the second feature vector $\bar{s}_t$ 418 for the linked first feature map tensor $F_t^s$.

According to various specific embodiments, image generator 104 can be set up (e.g. by the computer, e.g. by a layer implemented in image generator 104 based on machine learning, such as a neural network layer, e.g. first encoder 112) to apply a pooling method to the linked second subset of feature maps. For example, image generator 104 can be set up to apply the pooling method to the linked first feature map tensor $F_t^s$. The pooling method can for example be a max pooling (a maximum pooling) or a mean value pooling (mean pooling). According to various specific embodiments, the pooling method can be applied to the N second feature map tensors $F_t^{(n),s} \in \mathbb{R}^{F \times M \times M}$ of the linked second feature map tensor $\bar{F}_t^s \in \mathbb{R}^{N \times F \times M \times M}$. According to various specific embodiments, image generator 104 can be set up to produce a second set of pooling feature maps by applying the pooling method to the linked second feature map tensor $\bar{F}_t^s \in \mathbb{R}^{N \times F \times M \times}$. Clearly, in this way each pooling feature map of the second set of pooling feature maps can be assigned to a feature map of each second subset of feature maps 410B. For example, each feature of each pooling feature map can be assigned to a respective feature of a feature map of each assigned feature map. The respective feature of the respective pooling feature map can include a maximum value (e.g. in the case in which a max pooling is carried out) or a mean value (e.g. in the case in which a mean pooling is carried out) of the assigned features of all assigned feature maps. Clearly, in this way in each case a common second feature map can be produced for the respectively assigned feature maps of the various image sequences (and thus perspectives). In this way, the overall second feature map can be invariant with regard to perspective. In an illustrative example, it can be that N=3 and F=4, so that the linked second feature map tensor can be $\bar{F}_t^s \in \mathbb{R}^{3 \times 4 \times M \times M}$. The pooling method can be applied to each of the 4 feature maps of the second subset of feature maps in relation to the N=3 perspectives, so that for each f∈F from the N=3 perspectives, a respective common second feature map can be produced, so that $F_t \in \mathbb{R}^{4 \times M \times M}$ can hold for all common second feature maps. According to various specific embodiments, second encoder 114 can be set up to produce second feature vector 418 $\bar{s}_t$ for the second set of pooling feature maps. The production of second feature vector 418 $\bar{s}_t$ can be described for example by Equation (9):

$$\bar{s}_t = f_{s,max}(F_t^s), \quad (9)$$

where max indicates, as an example, that a max pooling method is carried out.

According to various specific embodiments, the pooling method can be applied to the second subsets of feature maps of a partial set of the images $I_t^{(n=1-N)}$ of time t. Clearly, in this way the respective second subset of feature maps 410B of one or more perspectives n∈N can remain not taken into account. In an illustrative example, it can be that N=5 and F=4, so that the linked second feature map tensor can be $\bar{F}_t^s \in \mathbb{R}^{5 \times 4 \times M \times M}$. The pooling method can for example be applied to each of the 4 feature maps of the first subset of feature maps for two, three, or four perspectives of the N=5 perspectives, so that at least one second subset of feature maps of a perspective is omitted. Clearly, in this way the pooling method can be combined with a dropout method. In this way, each produced common second feature map of the produced common second feature maps can be invariant with regard to the perspective.

According to various specific embodiments, a third feature vector $v^{(k)}$ 422 can be provided. Third feature vector $v^{(k)}$ 422 can for example be stored in the memory device. According to various specific embodiments, the third feature vector 422 can have a dimension equal to "1." Decoder 120 can be set up to produce a predicted target image 406 in reaction to an input of first feature vector 416, second feature vector 418, and third feature vector 422. According to various specific embodiments, decoder 120 can be set up to process a concatenation of first feature vector 416, second feature vector 418, and third feature vector 422, and, for this concatenation, to produce the predicted target image 406. According to various specific embodiments, third feature vector $v^{(k)}$ 422 can be assigned to the perspective k. As described above, the multiplicity of image sequences 402 can show a plurality of perspectives n∈N, but not the perspective k. According to various specific embodiments, decoder 120 can be set up to produce the predicted target image 406 from the perspective k in reaction to an input of first feature vector 416, second feature vector 418, and third feature vector $v^{(k)}$ 422 into decoder 120.

Figure 4C:
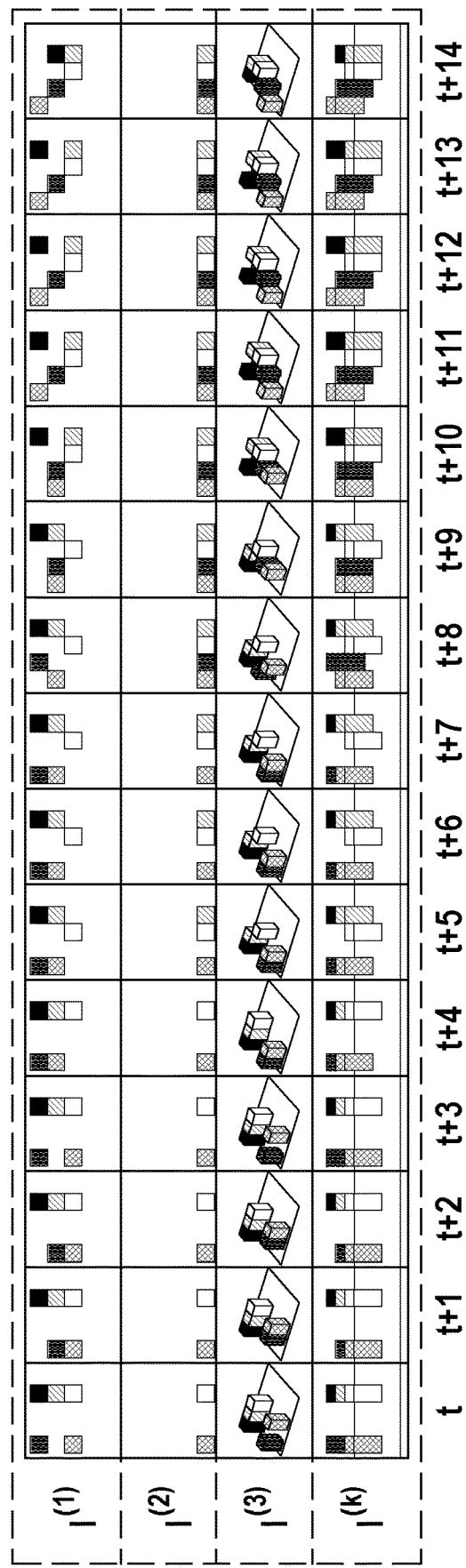
FIG. 4C shows, as an example, a plurality of image sequences according to different specific embodiments of the present invention.

FIG. 4C shows, as an example, a plurality of image sequences. In this example, the plurality of image sequences 402 can include a first image sequence $I^{(1)}$, a second image sequence $I^{(2)}$, and a third image sequence $I^{(3)}$ (e.g., it can be that N=3). The first image sequence $I^{(1)}$ can show a scene from a first perspective (e.g. from above), the second image sequence $I^{(2)}$ can show the same scene from a second perspective (e.g. from a second angle of view, e.g. from the front), and the third image sequence $I^{(3)}$ can show the same scene from a third perspective (e.g. an oblique top view). The plurality of times can for example include the times t, t+1, t+2, up to t+14. The first image sequence $I^{(1)}$ can for each time of a plurality of times assign an image to a respective time. The third image sequence $I^{(3)}$ can for each time of a plurality of times assign an image to a respective time. For example, to the time t there can be assigned the image $I_t^{(1)}$ of the first image sequence $I^{(1)}$, the image $I_t^{(2)}$ of the second image sequence $I^{(2)}$, and the image $I_t^{(3)}$ of the third image sequence $I^{(3)}$.

According to various specific embodiments, third feature vector $v^{(k)}$ 422 can be assigned to the perspective k (see for example the description relating to FIG. 4B). According to various specific embodiments, image generator 104 can produce a predicted target image 406 for each time of the plurality of times, in reaction to an input of the image, assigned to the respective time, of the first image sequence $I^{(1)}$, of the image, assigned to the respective time, of the second image sequence $I^{(2)}$, of the image, assigned to the respective time, of the third image sequence $I^{(3)}$, and of the third feature vector $v^{(k)}$ 422 into image generator 104.

For example, each predicted target image 406 can be assigned to the respective time. In this case, image generator 104 can produce, using third feature vector 422, for the first image sequence $I^{(1)}$, the second image sequence $I^{(2)}$, and the third image sequence $I^{(3)}$, a target image sequence $I^{(k)}$ that shows the scene from the perspective k assigned to the third feature vector $v^{(k)}$ 422. Clearly, in this way an image and/or an image sequence from a different perspective can be produced. Clearly, in this way for one or more image sequences a change of perspective can be produced.

Figure 5A:
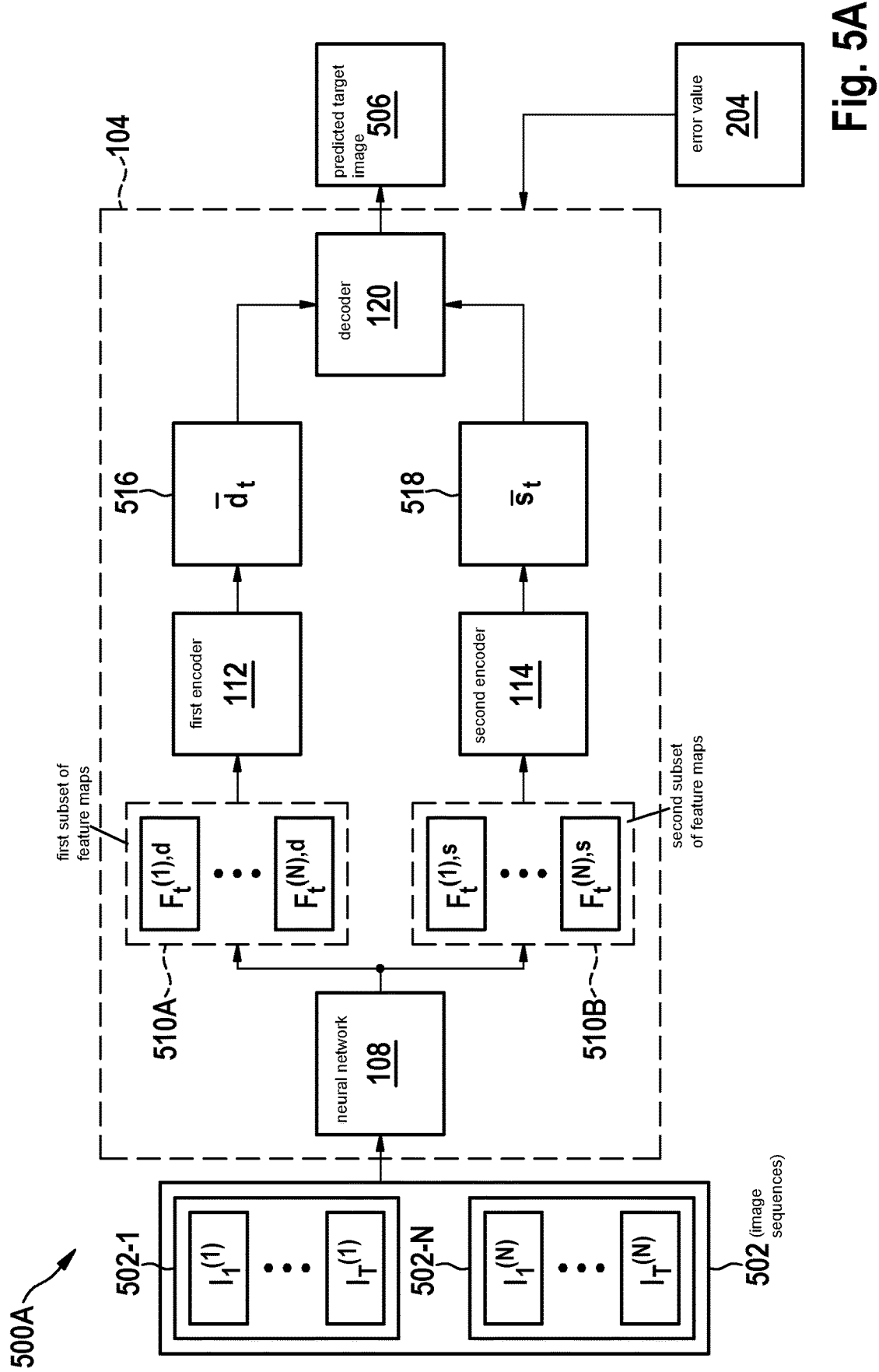
FIGS. 5A and 5B each show a processing system for training an image generator according to different specific embodiments of the present invention.

FIG. 5A shows a processing system 500A for training image generator 104 according to various specific embodiments. Processing system 500A can be similar to the processing system 200 described with reference to FIG. 2B, a multiplicity of image sequences 502 being supplied to image generator 104. Each image sequence 502-$n$ of the multiplicity of image sequences 502(1-N) can be assigned to a perspective of a multiplicity of perspectives (see for example the description relating to FIG. 4B).

The processing of the images $I_t^{(n=1-N)}$ assigned to a respective time t (in many aspects also designated $\{I_t^{(i)}\}_{t=1}^N$) of the multiplicity of image sequences 502(1-N) can correspond substantially to the processing described with reference to FIG. 4B: neural network 108 can produce, for each image $I_t^{(n)}$ assigned to a respective time t of the multiplicity of image sequences 502(1-N) a respective first subset of feature maps $F_t^{(n),d}$ 510A and a respective second subset of feature maps $F_t^{(n),ds}$ 510B. First encoder 112 can, for one or more (e.g. for all) first subset of feature maps 510A assigned to a respective time t, produce a first feature vector $\bar{d}_t$ 516. Second encoder 114 can or one or more (e.g. for all) second subset of feature maps 510B assigned to a respective time t, produce a second feature vector $\bar{s}_t$ 518. Decoder 120 can produce a predicted target image 506 for first feature vector 516 and second feature vector 518.

According to various specific embodiments, error value 204 can be ascertained (see for example the description relating to FIG. 2A and FIG. 2B).

Error value 204 can include the overall reconstruction error $\mathcal{L}_{vr}$. According to various specific embodiments, a reconstruction error can be ascertained for all predicted target images of the multiplicity of predicted target images 206. The overall reconstruction error $\mathcal{L}_{vr}$ can be ascertained using all ascertained reconstruction errors.

According to various specific embodiments, first encoder 112 can produce a respective first feature vector $d_t^{(n)}$ for each first subset of feature vectors $F_t^{(n),d}$. Clearly, in this way a number of N first feature vectors $d_t^{(n=1-N)}$ can be produced. For example, a production of a first feature vector $d_t^{(n=k)}$ can be described by Equation (10):

$$d_t^{(k)} = f_{d,none}(F_t^{(k),d}), \quad (10)$$

where none indicates that no pooling method was applied.

Error value 204 can have first error value $\mathcal{L}_{id}$. According to various specific embodiments, first error value $\mathcal{L}_{id}$ can be ascertained using the first multiplicity of anchor positive-negative triplets. Each anchor positive-negative triplet of the first multiplicity of anchor positive-negative triplets can be assigned to a respective time t. Each anchor positive-negative triplet of the first multiplicity of anchor positive-negative triplets can have as anchor vector a first feature vector $d_t^{(n=1)}$, assigned to the respective time t and selected from a first image sequence 502-1 of the multiplicity of image sequences 502. Each anchor positive-negative triplet of the first multiplicity of anchor positive-negative triplets can have as positive vector a first feature vector $d_t^{(n=m)}$, assigned to the respective time t and selected from a second image sequence 502-$m$ (where m≠1), differing from the first image sequence 502-1, of the multiplicity of image sequences 502.

According to various specific embodiments, second encoder 114 can produce, for each second subset of feature maps $F_t^{(n),s}$, a respective second feature vector $s_t^{(n)}$. Clearly, in this way a number of N second feature vectors $s_t^{(n=1-N)}$ can be produced. Error value 204 can have second error value $\mathcal{L}_{is}$.

According to various specific embodiments, second error value $\mathcal{L}_{is}$ can be ascertained using the second multiplicity of anchor positive-negative triplets. Each anchor positive-negative triplet of the second multiplicity of anchor positive-negative triplets can be assigned to a respective time t. Each anchor positive-negative triplet of the second multiplicity of anchor positive-negative triplets can have as anchor vector a second feature vector $s_t^{(n=q)}$ assigned to the respective time t and selected from an image sequence 502-$q$ of the multiplicity of image sequences 502. Each anchor positive-negative triplet of the second multiplicity of anchor positive-negative triplets can have as positive vector a second feature vector $s_t^{(n=r)}$ selected from an image sequence 502-$r$ of the multiplicity of image sequences 502. Image sequence 502-$r$ can be an image sequence different from image sequence 502-$q$ (r≠q). Image sequence 502-$r$ can correspond to image sequence 502-$q$ (r=q), such that second feature vector $s_t^{(n=r)}$ can be assigned to a first time and second feature vector $s_t^{(n=q)}$ can be assigned to a time different from the first time. Clearly, the anchor vector can have a second feature vector selected from the number of N feature vectors $s_t^{(n=1-N)}$, and the positive vector can have a second feature vector differing therefrom, selected from the number of N second feature vectors $s_t^{(n=1-N)}$.

According to various specific embodiments, $\mathcal{L}_{is}$ can have, for each produced second feature vector $s_t^{(n)}$ of the number of N second feature vectors $s_t^{(n=1-N)}$, a temporal loss of contrast (e.g. an L2 norm) between the respective second feature vector $s_t^{(n)}$ and a second feature vector produced for a respective reference image of one or more provided reference images (e.g. one or more reference images stored in the storage device).

According to various specific embodiments, a different multiplicity of image sequences can be provided. The different multiplicity of image sequences can show a scene differing from the multiplicity of image sequences 502 (e.g. in the same or similar work area). Each image sequence of the different multiplicity of image sequences can have a respective image for each time of a different plurality of times. According to various specific embodiments, the second encoder 114 can produce, using neural network 108, a respective second feature vector for one or more times of the different plurality of times for each image, assigned to the respective time, of each image sequence of the different plurality of image sequences. According to various specific embodiments, decoder 120 can ascertain a predicted target image for each first target vector of the first target vectors produced for the multiplicity of image sequences 502, by supplying to decoder 120 the respective first feature vector and a second feature vector selected from among the second feature vectors produced for the different multiplicity of image sequences. According to various specific embodiments, a discriminator (e.g. a pre-trained discriminator, e.g. a pre-trained discriminative neural network) can be provided. According to various specific embodiments, the discriminator can ascertain a respective discriminator error value for each predicted target image produced in this way. The second error value can have the discriminator error values.

According to various specific embodiments, error value 204, as described herein, can be ascertained using first error value $\mathcal{L}_{id}$, second error value $\mathcal{L}_{is}$ and/or the overall reconstruction error value $\mathcal{L}_{vr}$.

Figure 5B:
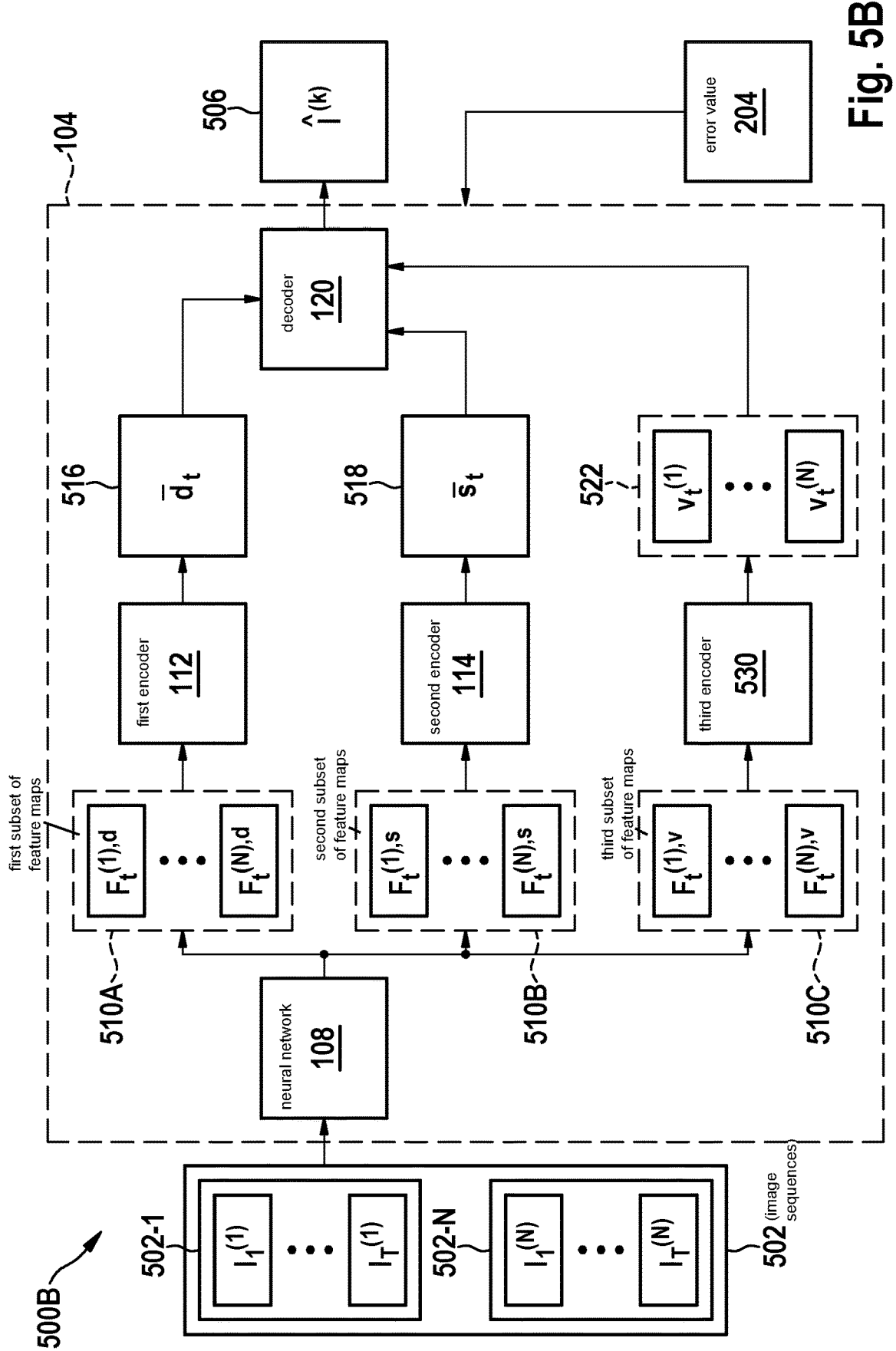

FIG. 5B shows a processing system 500B for training image generator 104 according to various specific embodiments. Processing system 500B can substantially correspond to processing system 500A, image generator 104 additionally having a third encoder 530.

According to various specific embodiments, the multiplicity of feature maps produced by neural network 108 for each image of an image sequence of the multiplicity of image sequences 502 can include the first subset of feature maps 510A, the second subset of feature maps 510B, and a third subset of feature maps 510C. For example, an exemplary multiplicity of feature maps $F_t \in \mathbb{R}^{P \times M \times M}$ can include a first disjoint partial set of the P feature maps as first subset of feature maps 510A, a second disjoint partial set of the P feature maps as second subset of feature maps 510B, and a third disjoint partial set of the P feature maps as third subset of feature maps 510C. In an example, it can be that the number P=3F, and the first subset of feature maps 510A can include a number of F feature maps of the multiplicity of feature maps, the second subset of feature maps 510B can include a number of F feature maps of the multiplicity of feature maps, and the third subset of feature maps 510C can include a number of F feature maps of the multiplicity of feature maps. For example, the first subset of feature maps 510A can be described by $F_t^d \in \mathbb{R}^{F \times M \times M}$. For example, the second subset of feature maps 510B can be described by $F_t^s \in \mathbb{R}^{F \times M \times M}$. For example, the third subset of feature maps 510C can be described by $F_t^v \in \mathbb{R}^{F \times M \times M}$, where {v} identifies the third subset.

Third encoder 530 can be set up to process the third subset of feature maps $F_t^{(n),v}$ of an image of an image sequence of the multiplicity of image sequences 502. According to various specific embodiments, third encoder 530 can be set up to produce a third feature vector $v_t^{(n)}$ 522 in reaction to an input of the third subset of feature maps $F_t^{(n),v}$ of an image into third encoder 530. For the third subset of feature maps $F_t^{(n),v}$, third encoder 530 can produce third feature vector $v_t^{(n)}$ 522 according to Equation (11):

$$v_t^{(k)} = f_v(F_t^{(k),v}), \quad (11)$$

where $f_v(\cdot)$ identifies third encoder 530 and k identifies an exemplary image sequence n=k. According to various specific embodiments, third feature vector 522 can have a dimension equal to "1." Clearly, the third feature vector, having a dimension equal to "1," be an indicator function in relation to a perspective.

According to various specific embodiments, third encoder 530 can produce a respective third feature vector $v_t^{(n)}$ 522 for each third subset, assigned to a respective image $\{I_t^{(i)}\}_{i=1}^N$, of feature maps $F_t^{(n=1-N),v}$. Clearly, in this way third encoder 530 can produce a multiplicity of third feature vectors $\{v_t^{(i)}\}_{i=1}^N$ for each time t. Each third feature vector $v_t^{(n)}$ 522 can be assigned to an image sequence 502-n of the multiplicity of image sequences 502. Clearly, each third feature vector $v_t^{(n)}$ 522 can be assigned to a perspective of the multiplicity of perspectives that show the multiplicity of image sequences 502.

According to various specific embodiments, decoder 120 can be set up to produce a predicted target image $\hat{I}^{(k)}$ 506 in reaction to an input of a first feature vector 516 assigned to a respective time, a second feature vector (e.g. the second feature vector, which is assigned to the time of the first feature vector, e.g. a second feature vector assigned to a time different from the time of the first feature vector), and a selected third feature vector $v^{(n=k)}$ 522 into decoder 120. The predicted target image $\hat{I}^{(k)}$ 506 can include the perspective assigned to the selected third feature vector $v^{(n=k)}$ 522. The selected third feature vector $v^{(n=k)}$ 522 can be assigned to the time of the first feature vector or to a time different from the time of the first feature vector.

According to various specific embodiments, decoder 120 can produce a respective predicted target image $\hat{I}_t^{(n=i)}$ 506 for each time t of the plurality of times t=1-T, for each third feature vector $v_t^{(n=1-N)}$ 522 of the multiplicity of third feature vectors $\{v_t^{(i)}\}_{i=1}^N$. A respective predicted target image $\hat{I}_t^{(n=i)}$ 506 can be produced for example by supplying a third feature vector $v_t^{(n)}$, assigned to a time t, a first feature vector assigned to the time of the third feature vector, and a second feature vector assigned to the time of the third feature vector into decoder 120. Clearly, in this way a multiplicity of predicted target images $\{\hat{I}_t^{(i)}\}_{i=1}^N$ can be produced for each time t.

According to various specific embodiments, for each predicted target image (e.g. of the multiplicity of predicted target image $\{\hat{I}_t^{(i)}\}_{i=1}^N$ of all times of the plurality of times t=1-T), a reconstruction error between the predicted target image $\hat{I}_t^{(n)}$ and the assigned target image $I_z^{(n)}$ can be ascertained. As described herein, it can be that z=t, z=t+1, etc. According to various specific embodiments, the overall reconstruction error $\mathcal{L}_{vr}$ can be ascertained according to Equation (12):

$$\mathcal{L}_{vr} = \frac{1}{NT} \sum_{t=1}^{T} \sum_{i=1}^{N} \|I_z^{(i)} - \hat{I}_t^{(i)}\|_2^2, \quad (12)$$

where T is the number of times of the plurality of times.

Third encoder 530 can be trained for the reduction of the overall reconstruction error $\mathcal{L}_{vr}$.

According to various specific embodiments, third encoder 530 can be trained for the reduction of the overall error value $\mathcal{L}$, ascertained by weighted summing of the first error value $\mathcal{L}_{id}$, the second $\mathcal{L}_{is}$, and the overall reconstruction error value $\mathcal{L}_{vr}$. According to various specific embodiments, first encoder 112, second encoder 114, third encoder 530, and decoder 120 can be trained for the reduction of the error value 204, such as for example the overall error value $\mathcal{L}$.

FIG. 6A shows a processing system 600A having image generator 104 for producing an image from a selected perspective, according to various specific embodiments. Image generator 104 can have been trained as described in relation to FIG. 5B, the target image being the image for which the first feature vector is produced by first encoder 112. Clearly, the target image can be assigned to the time of the associated first feature vector. According to various specific embodiments, image generator 104 (e.g. trained image generator 104) can produce, for each image sequence of the multiplicity of image sequences 502, at least one respective third feature vector $v^{(n)}$. Clearly, in this way image generator 104 can produce a multiplicity of third feature vectors $v^{(n=1-N)}$ 622. The multiplicity of third feature vectors $v^{(n=1-N)}$ 622 can be stored in the storage device.

According to various specific embodiments, one or more images $I_t^{(n=1-N)}$ can be provided to image generator 104 (e.g. by the one or more sensors). Each image $I_t^{(n)}$ of the one or more images $I_t^{(n=1-N)}$ can show a scene from a respective perspective of the multiplicity of perspectives. According to various specific embodiments, it can be for example that no image of the one or more images $I_t^{(n=1-N)}$ shows the scene from the perspective k.

For each image $I_t^{(n)}$ of the one or more images $I_t^{(n=1-N)}$, neural network 108 can produce a respective first subset of feature maps $F_t^{(n),d}$ 610A. For all first subsets of feature maps $F_t^{(n=1-N),d}$ 610A, first encoder 112 can produce a common first feature vector $\bar{d}_t$ 616.

For each image $I_t^{(n)}$ of the one or more images $I_t^{(n=1-N)}$, neural network 108 can produce a respective second subset of feature maps $F_t^{(n),s}$ 610B. For all second subsets of feature maps $F_t^{(n=1-N),s}$ 610B, second encoder 114 can produce a common second feature vector $\bar{s}_c$ 618. According to various specific embodiments, for an image $I_\tau^{(n)}$ selected from the one or more images $I_t^{(n=1-N)}$, neural network 108 can produce a second subset of feature maps $F_\tau^{(n),s}$ 610B. For the second subset of feature maps $F_\tau^{(n),s}$ 610B, second encoder 114 can produce the second feature vector $\bar{s}_c$ 618. Clearly, according to various specific embodiments the second feature vector can be produced for a perspective. This can reduce a required computational outlay. Clearly, the second feature vector describes static features of the one or more images $I_t^{(n=1-N)}$, so that one or more perspectives of the multiplicity of perspectives can be sufficient for the production of the second feature vector.

According to various specific embodiments, decoder 120 can produce a (predicted) image $\hat{I}_t^{(k)}$ 606 with a selected perspective k by selecting a third feature vector $v^{(n=k)}$ 624, which is assigned to the selected perspective k, from the multiplicity of third feature vectors $v^{(n=1-N)}$ 622, and by supplying first feature vector $\bar{d}_t$ 616, second feature vector $\bar{s}_c$ 618, and the selected third feature vector $v^{(n=k)}$ 624 to decoder 120.

According to various specific embodiments, one or more image sequences $I_t^{(n=1-N)}$, where t=1-T, 602 can be provided to image generator 104 (e.g. by the one or more sensors). Each image sequence of the one or more image sequences 602 can show a scene from a respective perspective of the multiplicity of perspectives. According to various specific embodiments, it can be for example that no image sequence of the one or more image sequences 602 shows the scene from the perspective k. Each image sequence of the one or more image sequences 602 can have a respective image $I_t^{(n)}$ for each time t of a multiplicity of times t=1-T.

Neural network 108 can produce a respective first subset of feature maps $F_t^{(n),d}$ 610A for each time t of the plurality of times t=1-T for each image, assigned to the respective time t, of the one or more image sequences 602. For each time t of the plurality of times, for all of the first subset of feature maps $F_t^{(n),d}$ 610A assigned to the respective time, first encoder 112 can produce a common first feature vector $\bar{d}_t$ 616.

Neural network 108 can produce a respective second subset of feature maps $F_t^{(n),s}$ 610B for each time t of the plurality of times t=1-T for each image, assigned to the respective time t, of each image sequence of the one or more image sequences 602. For each time t of the plurality of times, for all of the second subset of feature maps $F_t^{(n),s}$ 610B assigned to the respective time, second encoder 114 can produce a common second feature vector 618. According to various specific embodiments, for a time $\tau$, selected from the plurality of times t=1-T, for an image $I_\tau^{(n)}$ assigned to the time $\tau$ and selected from an image sequence 602(n) of the one or more image sequences 602, neural network 108 can produce a second subset of feature maps $F_\tau^{(n),s}$ 610B. Clearly, a second subset of feature maps $F_\tau^{(n),s}$ 610B can be produced for an image selected from the one or more image sequences 602. For the second subset of feature maps $F_\tau^{(n),s}$ 610B, second encoder 114 can produce the second feature vector $\bar{s}_c$ 618. Clearly, according to various specific embodiments the second feature vector can be produced for a single time of the plurality of times and for a perspective. This can reduce a required computational outlay. Clearly, the second feature vector describes static features of the one or more image sequences, so that one or more times and/or one or more perspectives of the multiplicity of perspectives can be sufficient for the production of the second feature vector.

According to various specific embodiments, decoder 120 can produce a (predicted) image sequence $\hat{I}_t^{(k)}$, where t=1-T, 606, with a selected perspective k, in that a third feature vector $v^{(n=k)}$ 624, assigned to the selected perspective k, is selected from the multiplicity of third feature vectors $v^{(n=1-N)}$ 622, and in that the common first feature vector $\bar{d}_t$ 616, assigned to the respective time t, the second feature vector $\bar{s}_c$ 618, and the selected third feature vector $v^{(n=k)}$ 624 are supplied to decoder 120 for each time t of the plurality of times. Clearly, each predicted image $\hat{I}_t^{(k)}$ of the predicted image sequence can be produced using the second feature vector 618 and the selected third feature vector $v^{(n=k)}$ 624, such that exclusively the common first feature vector $\bar{d}_t$ 616 can be assigned to the respective time t. In this way, a computational outlay can be significantly reduced. Clearly, the second feature vector describes static (e.g. non-changing) features of the scene that the one or more image sequences 602 show, and the third feature vector describes a respective perspective as an angle of view on the scene. The static features can be invariant with regard to the perspective. Clearly, the first feature vector describes dynamic (e.g. changing) features of the scene, so that, using the first feature vector assigned to a respective time t, the respective predicted target image can be produced.

Figure 6B:
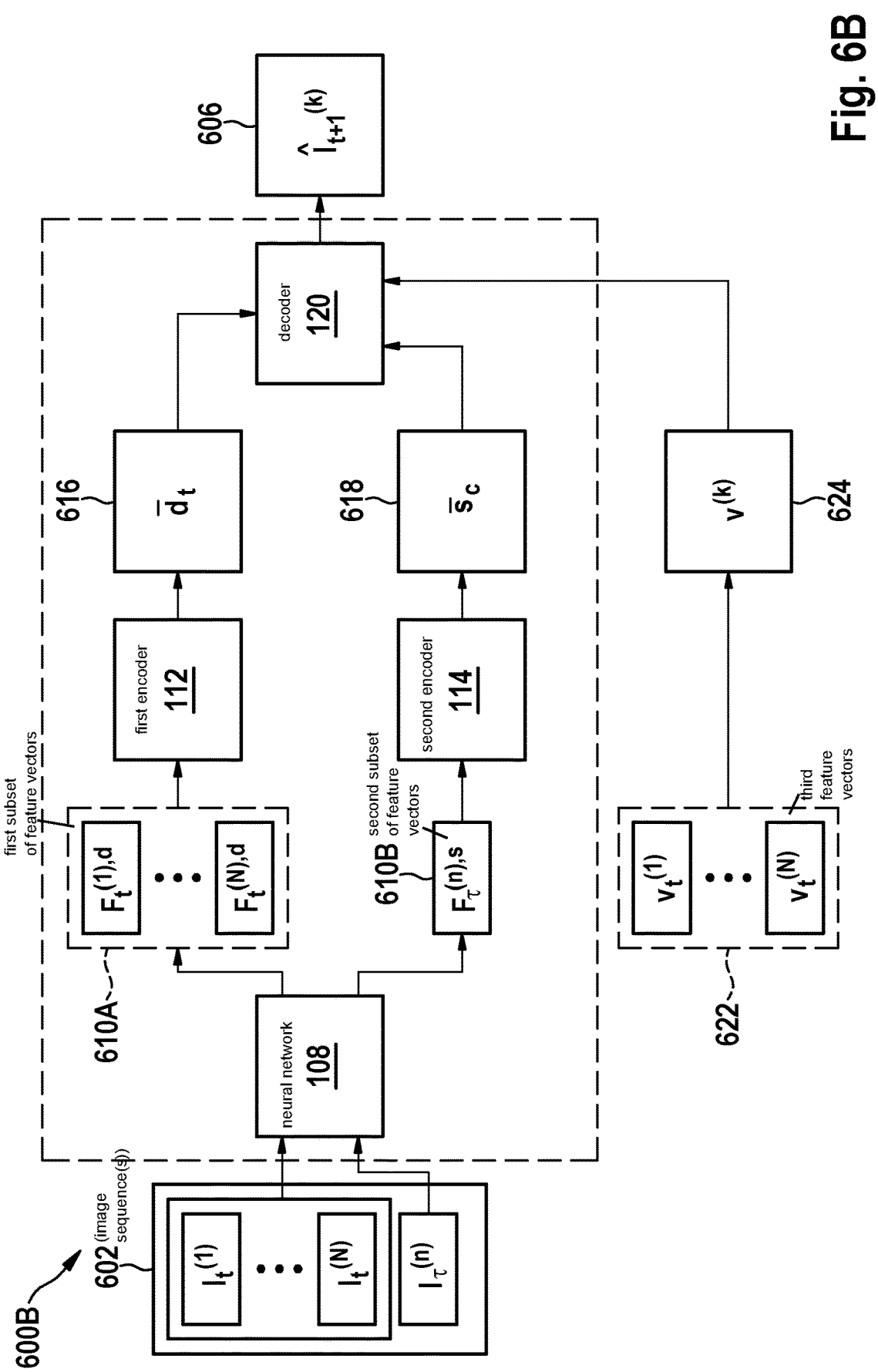
FIG. 6B shows a processing system for video prediction according to various specific embodiments of the present invention.

FIG. 6B shows a processing system 600B for video prediction according to various specific embodiments. Processing system 600B can correspond substantially to processing system 600A; here image generator 104, as described in relation to FIG. 5B, can have been trained in such a way that the target image is assigned to a time t+1 following time t. Clearly, the target image can follow the time that is assigned to the associated first feature vector. According to various specific embodiments, processing system 600B can have the multiplicity of third feature vectors $v^{(n=1-N)}$ 622.

According to various specific embodiments, the one or more image sequences 602 can be supplied to image generator 104. According to various specific embodiments, for a time t, using the images assigned to the time of the one or more image sequences 602, image generator 104 can produce a predicted target image $\hat{I}_{t+1}^{(k)}$ that follows the time t (z=t+1). For example, the one or more image sequences 602 can be one or more video sequences having continuous images $I_t^{(n)}$ and image generator 104 can predict an image of a next time t+1 from a selected perspective k.

FIG. 6C shows a processing system 600C for anomaly detection according to various specific embodiments. Processing system 600C can correspond substantially to processing system 600B, the next image $I_{t+1}^{(k)}$ of the image sequence assigned to the selected perspective k being additionally acquired. According to various specific embodiments, the computer can be set up to compare the acquired next image $I_{t+1}^{(k)}$ with the predicted next image $\hat{I}_{t+1}^{(k)}$. According to various specific embodiments, the computer can be set up to ascertain a comparison value 640 between the acquired next image $I_{t+1}^{(k)}$ and the predicted next image $\hat{I}_{t+1}^{(k)}$. According to various specific embodiments, the computer can be set up to ascertain (e.g. to detect) an anomaly 642 if the ascertained comparison value 640 is smaller than a predefined threshold value. The predefined threshold value can for example be stored in the storage device. Clearly, comparison value 640 can indicate to what extent (e.g. what percent) the acquired next image $I_{t+1}^{(k)}$ and the predicted next image $\hat{I}_{t+1}^{(k)}$ agree. Clearly, the computer can detect an anomaly if a deviation of the acquired next image $I_{t+1}^{(k)}$ from the predicted next image $\hat{I}_{t+1}^{(k)}$ becomes too large (in such a way that the comparison value 640 is below the predefined threshold value).

Figure 7:
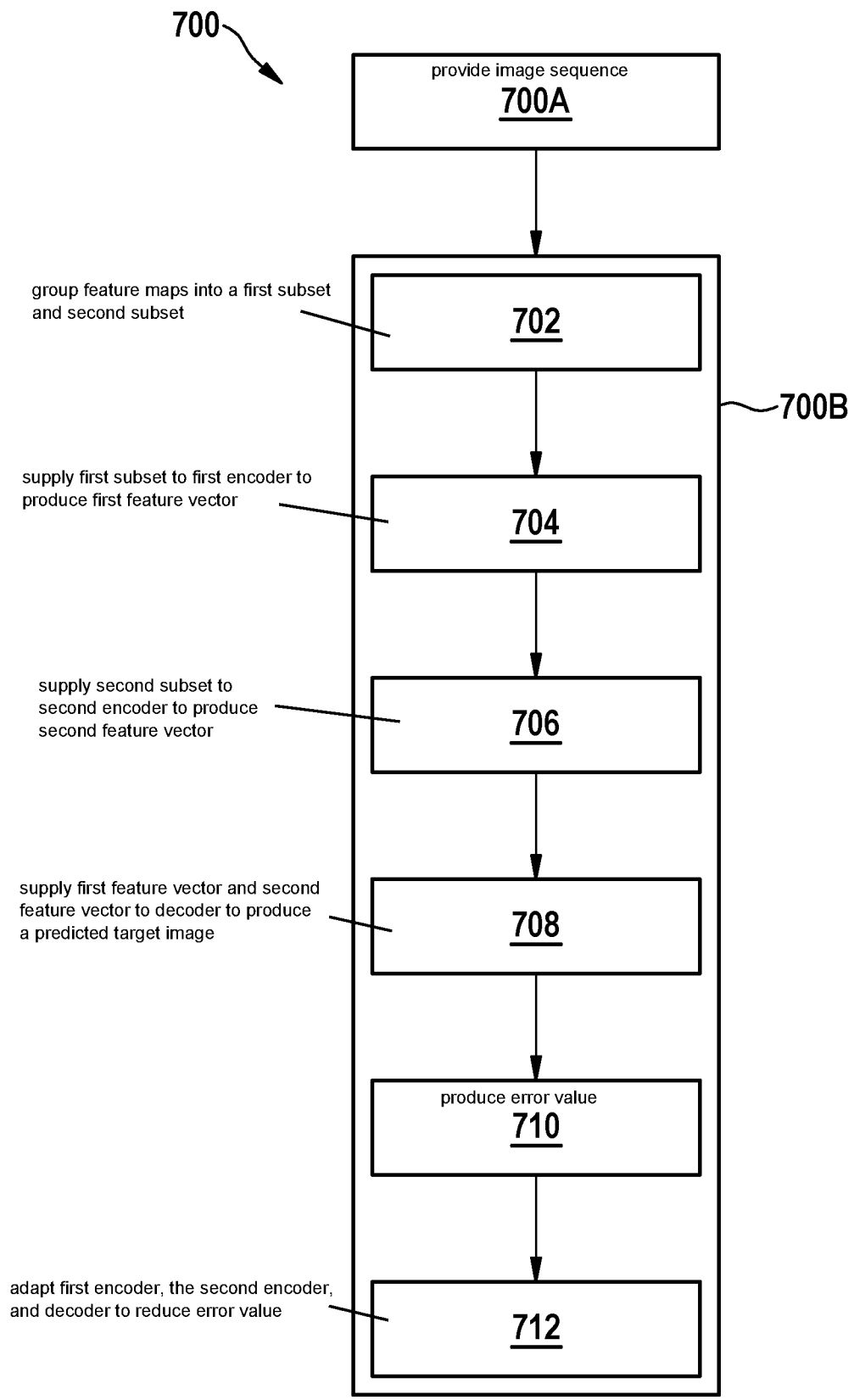
FIG. 7 shows a method for training an image generator according to various specific embodiments of the present invention.

FIG. 7 shows a method 700 for training an image generator according to various specific embodiments.

According to various specific embodiments, method 700 can include a provision of at least one image sequence that has an image for each time of a plurality of times (in 700A).

Method 700 can include a training of a first encoder, a second encoder, and a decoder (in 700B).

The training of the first encoder, the second encoder, and the decoder can include, for each of a number of times of the plurality of times: for the image assigned to the time, a production of the multiplicity of feature maps by a neural network (e.g. by a plurality of layers of a neural network pre-trained for image processing) in reaction to an input of the image into the neural network, and a grouping of the multiplicity of feature maps into a first subset and a second subset (in 702).

The training of the first encoder, the second encoder, and the decoder can include, for each of a number of times of the plurality of times: a supplying of the first subset to the first encoder in order to produce a first feature vector for the image assigned to the time (in 704).

The training of the first encoder, the second encoder, and the decoder can include, for each of a number of times of the plurality of times: a supplying of the second subset to the second encoder in order to produce a second feature vector for the image assigned to the time (in 706).

The training of the first encoder, the second encoder, and the decoder can include, for each of a number of times of the plurality of times: a supplying of the first feature vector and the second feature vector to the decoder in order to produce a predicted target image (in 708).

The training of the first encoder, the second encoder, and the decoder can include, for each of a number of times of the plurality of times, a production of an error value (in 710). The error value can be smaller the larger a difference is between first feature vectors produced for images differing from one another of the at least one image sequence. The error value can be smaller the smaller a difference is between second feature vectors produced for images differing from one another of the at least one image sequence. The error value can be smaller the larger a difference is between first feature vectors produced for images differing from one another of the at least one image sequence. The error value can include a reconstruction error between the target image, predicted by the decoder for a respective image of the at least one image sequence, and a reference target image.

The training of the first encoder, the second encoder, and the decoder can include, for each of a number of times of the plurality of times: an adaptation of the first encoder, the second encoder, and the decoder in order to reduce the error value (in 712).

What is claimed is:

1. A method for training an image generator, the method comprising the following steps: providing at least one image sequence that includes an image for each time of a plurality of times; and training a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder, and the decoder to reduce the error value.

2. The method as recited in claim 1, the error value has a temporal loss of contrast between first feature vectors produced for images differing from one another, and/or the error value has a temporal loss of contrast between a second feature vector produced for an image of the at least one image sequence and a second feature vector produced for a reference image of one or more provided reference images.

3. The method as recited in claim 1, wherein: the error value is an overall error value; the producing of the error value includes: ascertaining a first multiplicity of anchor positive-negative triplets, each anchor positive-negative triplet of the first multiplicity of anchor positive-negative triplets: being assigned to a respective time; having, as an anchor vector, a first feature vector produced by the first encoder for the first subset of feature maps of the image, assigned to the assigned time, of the at least one image sequence, having, as a positive vector, a first feature vector produced by the first encoder for the first subset of feature maps of the image assigned to the time preceding or following the assigned time, and having, as a negative vector, a first feature vector for the first subset of feature maps of the image, assigned to a time differing from the assigned time, the preceding time, and the following time, of the at least one image sequence; ascertaining a first error value for the first multiplicity of anchor positive-negative triplets, the first error value correspondingly increasing, for each anchor positive-negative triplet, a distance measure according to a distance metric between the anchor vector and the positive vector and correspondingly decreasing a distance measure according to the distance metric between the anchor vector and the negative vector; ascertaining a second multiplicity of anchor positive-negative triplets, each anchor positive-negative triplet of the second multiplicity of anchor positive-negative triplets:being assigned to a respective time, having, as an anchor vector, a second feature vector produced by the second encoder for the second subset of feature maps of a first image selected from the at least one image sequence, having, as a positive vector, a second feature vector produced by the second encoder for the second subset of feature maps of a second image differing from the first image and selected from the at least one image sequence, having, as negative vector, a second feature vector produced by the second encoder for a reference image of one or more provided reference images; ascertaining a second error value for the second multiplicity of anchor positive-negative triplets, the second error value for each anchor positive-negative triplet correspondingly increasing a distance measure according to a distance metric between the anchor vector and the positive vector, and correspondingly reducing a distance measure according to the distance metric between the anchor vector and the negative vector; the overall error being ascertained by weighted summing of the first error value, the second error value, and the reconstruction error.

4. The method as recited in claim 1, wherein the neural network has one or more layers of a neural network that is pre-trained for image processing.

5. A method for video prediction using a trained image generator, the image generator being trained by: providing at least one image sequence that includes an image for each time of a plurality of times; and training a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder, and the decoder to reduce the error value; wherein the target image is an image of the at least one image sequence following the image for which the first feature vector was produced by the first encoder, and the method comprises the following steps: acquiring a current image of a video sequence; producing, for the current image, a first feature vector by the first encoder; producing, for the current image or a previously acquired image of the video sequence, a second feature vector by the second encoder; and predicting by the decoder of a next image, using the produced first feature vector and the produced second feature vector.

6. A method for anomaly detection using a trained image generator, the image generator being trained by: providing at least one image sequence that includes an image for each time of a plurality of times; and training a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder, and the decoder to reduce the error value; wherein the target image is an image of the at least one image sequence following the image for which the first feature vector was produced by the first encoder, and the method comprises the following steps: acquiring a current image of a video sequence; for the current image, producing a first feature vector by the first encoder; for the current image or a previously acquired image of the video sequence, producing a second feature vector by the second encoder;predicting, by the decoder, of a next image using the produced first feature vector and the produced second feature vector;acquiring the next image; ascertaining a comparison value by comparing the next image with the predicted image; and detecting an anomaly based on the ascertained comparison value being smaller than a predefined threshold value.

7. The method as recited in claim 3, wherein: the providing of the at least one image sequence includes: providing a multiplicity of image sequences, each image sequence of the multiplicity of image sequences having a respective image for each time of the plurality of times, and a respective perspective of a multiplicity of perspectives of the same scene being assigned to each image sequence of the multiplicity of image sequences; the producing of the multiplicity of feature maps by the neural network for the image, assigned to the time, of the at least one image sequence, and the grouping of the multiplicity of feature maps into the first subset and the second subset include: for each of a number of times of the plurality of times: for each image, assigned to the respective time, of each image sequence of the multiplicity of image sequences, producing a respective multiplicity of feature maps by the neural network, and grouping the multiplicity of feature maps into a first subset and a second subset; the supplying of the first subset to the first encoder for the production of the first feature vector for the image assigned to the time includes: supplying the first subset of feature maps of all images assigned to the respective time to the first encoder for the production of the first feature vector for the images assigned to the time; and the supplying of the second subset to the second encoder for the production of the second feature vector for the image assigned to the time includes: supplying the second subset of feature maps of all images assigned to the respective time to the second encoder for the production of the second feature vector for the images assigned to the time.

8. The method as recited in claim 7, wherein: the respective anchor vector of each anchor positive-negative triplet of the first multiplicity of anchor positive- negative triplets is selected from a first image sequence of the multiplicity of image sequences; the respective positive vector of each anchor positive-negative triplet of the first multiplicity of anchor positive-negative triplets is selected from a second image sequence, differing from the first image sequence, of the multiplicity of image sequences, or the respective positive vector of each anchor positive-negative triplet of the first multiplicity of anchor positive-negative triplets is selected for the image that is assigned to the time preceding or following the time assigned to the anchor positive-negative triplet; the first image is selected from an image sequence of the multiplicity of image sequences and the second image is selected from an image sequence of the multiplicity of image sequences.

9. The method as recited in claim 7, wherein: the error value has a temporal loss of contrast between a second feature vector produced for an image of an image sequence of the multiplicity of image sequences and a second feature vector produced for a reference image of one or more provided reference images; and/or the supplying of the first feature vector and of the second feature vector to the decoder for the production of the predicted target image includes: for each produced first feature vector, supplying the first feature vector and a second feature vector selected from among the produced second feature vectors, to the decoder for the production of the predicted target image; for each predicted target image, ascertaining a reconstruction error between the predicted target image and the respective reference target image, the error value having the ascertained reconstruction error; and/or the training of the first encoder, the second encoder, and the decoder includes: providing a different multiplicity of image sequences that show a scene different from the scene of the multiplicity of image sequences, each image sequence of the different multiplicity of image sequences having a respective image for each time of a different plurality of times; for one or more times of the different plurality of times, for each image assigned to the respective time, of each image sequence of the different multiplicity of image sequences, producing a second feature vector by the second encoder; for each first feature vector produced for the multiplicity of image sequences, supplying the first feature vector of a second feature vector selected from among the second feature vectors produced for the different multiplicity of image sequences to the decoder for the production of a predicted target image; for each predicted target image, ascertaining a discriminator error value for the predicted target image by a discriminator, the error value having the ascertained discriminator error values.

10. The method as recited in claim 7, wherein: the grouping of the multiplicity of feature maps into a first subset and a second subset includes: grouping the multiplicity of feature maps into a first subset, a second subset, and a third subset; the training of the first encoder, the second encoder, and the decoder includes a training of the first encoder, the second encoder, a third encoder, and the decoder, including: for each image sequence of the multiplicity of image sequences: for each image of the image sequence, supplying the third subset of the image to the third encoder for producing a third feature vector to which the respective perspective of the image sequence assigned to the image is assigned; the supplying of the first feature vector and the second feature vector to the decoder for the production of the predicted target image includes: supplying the first feature vector, the second feature vector, and a third feature vector selected from among the produced third feature vectors to the decoder for the production of the predicted target image from the perspective assigned to the third feature vector; and the adaptation of the first encoder, the second encoder, and the decoder for reducing the error value includes an adaptation of the first encoder, the second encoder, the third encoder, and the decoder for the reduction of the error value.

11. The method as recited in claim 7, further comprising: for each image sequence of the multiplicity of image sequences, producing at least one third feature vector using a respective image of the image sequence.

12. A method for producing an image of a scene having a perspective selected from a multiplicity of perspectives by a trained image generator using one or more images that show the scene from a respective different perspective of the multiplicity of perspectives, the image generator being trained by: providing at least one image sequence that includes an image for each time of a plurality of times; and training a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder, and the decoder to reduce the error value; wherein:

the providing of the at least one image sequence includes: providing a multiplicity of image sequences, each image sequence of the multiplicity of image sequences having a respective image for each time of the plurality of times, and a respective perspective of a multiplicity of perspectives of the same scene being assigned to each image sequence of the multiplicity of image sequences; the producing of the multiplicity of feature maps by the neural network for the image, assigned to the time, of the at least one image sequence, and the grouping of the multiplicity of feature maps into the first subset and the second subset include: for each of a number of times of the plurality of times: for each image, assigned to the respective time, of each image sequence of the multiplicity of image sequences, producing a respective multiplicity of feature maps by the neural network, and grouping the multiplicity of feature maps into a first subset and a second subset; the supplying of the first subset to the first encoder for the production of the first feature vector for the image assigned to the time includes: supplying the first subset of feature maps of all images assigned to the respective time to the first encoder for the production of the first feature vector for the images assigned to the time; and the supplying of the second subset to the second encoder for the production of the second feature vector for the image assigned to the time includes: supplying the second subset of feature maps of all images assigned to the respective time to the second encoder for the production of the second feature vector for the images assigned to the time; and for each image sequence of the multiplicity of image sequences, producing at least one third feature vector using a respective image of the image sequence; wherein the method comprises: producing a first feature vector for the one or more images by the first encoder;producing a second feature vector for the one or more images by the second encoder; producing by the decoder the image having the selected perspective using the produced first feature vector, the produced second feature vector, and a third feature vector assigned to the selected perspective.

13. A method for producing an image sequence that shows a scene from a perspective selected from one of the multiplicity of perspectives by a trained image generator using one or more image sequences that show the scene from a respective different perspective of the multiplicity of perspectives, and that have a respective image for each time of a plurality of times, the image generator being trained by: providing at least one image sequence that includes an image for each time of a plurality of times; and training a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder, and the decoder to reduce the error value; wherein: the providing of the at least one image sequence includes: providing a multiplicity of image sequences, each image sequence of the multiplicity of image sequences having a respective image for each time of the plurality of times, and a respective perspective of a multiplicity of perspectives of the same scene being assigned to each image sequence of the multiplicity of image sequences; the producing of the multiplicity of feature maps by the neural network for the image, assigned to the time, of the at least one image sequence, and the grouping of the multiplicity of feature maps into the first subset and the second subset include: for each of a number of times of the plurality of times: for each image, assigned to the respective time, of each image sequence of the multiplicity of image sequences, producing a respective multiplicity of feature maps by the neural network, and grouping the multiplicity of feature maps into a first subset and a second subset; the supplying of the first subset to the first encoder for the production of the first feature vector for the image assigned to the time includes: supplying the first subset of feature maps of all images assigned to the respective time to the first encoder for the production of the first feature vector for the images assigned to the time; and the supplying of the second subset to the second encoder for the production of the second feature vector for the image assigned to the time includes: supplying the second subset of feature maps of all images assigned to the respective time to the second encoder for the production of the second feature vector for the images assigned to the time; and for each image sequence of the multiplicity of image sequences, producing at least one third feature vector using a respective image of the image sequence; wherein the method comprises: for each time of the plurality of times: for each image, assigned to the respective time, of each image sequence of the one or more image sequences, producing a first feature vector by the first encoder; for at least one time of the plurality of times: for each image, assigned to the time, of each image sequence of the one or more image sequences, producing a second feature vector by the second encoder; producing by the decoder the image sequence having the selected perspective using the produced first feature vectors, the second feature vector produced for the at least one time, and a third feature vector assigned to the selected perspective.

14. A device configured to train an image generator, the device configured to: provide at least one image sequence that includes an image for each time of a plurality of times; and train a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder; and the decoder to reduce the error value.

15. A non-transitory computer-readable medium on which is stored instructions for training an image generator, the instructions, when executed by a processor, causing the processor to perform the following steps: providing at least one image sequence that includes an image for each time of a plurality of times; and training a first encoder, a second encoder, and a decoder by, for each time of a number of times of the plurality of times: for the image of the at least one image sequence assigned to the time, producing a multiplicity of feature maps by a neural network in reaction to an input of the image into the neural network, and grouping the multiplicity of feature maps into a first subset and a second subset; supplying the first subset to the first encoder to produce a first feature vector for the image assigned to the time; supplying the second subset to the second encoder to produce a second feature vector for the image assigned to the time; supplying the first feature vector and the second feature vector to the decoder to produce a predicted target image; producing an error value: the error value being smaller the greater a difference is between first feature vectors produced for images differing from one another of the at least one image sequence, the error value being smaller the smaller a difference is between second feature vectors produced for images differing from one another of the at least one image sequence, the error value having a reconstruction error between the target image predicted by the decoder for a respective image of the at least one image sequence and a reference target image, adapting the first encoder, the second encoder, and the decoder to reduce the error value.

* * * * *